United States Patent
Tim Iben

(10) Patent No.: US 8,120,353 B2
(45) Date of Patent: Feb. 21, 2012

(54) METHODS FOR DETECTING DAMAGE TO MAGNETORESISTIVE SENSORS

(75) Inventor: Icko E. Tim Iben, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 12/111,083

(22) Filed: Apr. 28, 2008

(65) Prior Publication Data

US 2009/0268324 A1   Oct. 29, 2009

(51) Int. Cl.
*G01R 33/12* (2006.01)
*G01R 27/08* (2006.01)

(52) U.S. Cl. ............ 324/210; 324/691; 324/713

(58) Field of Classification Search ......... 324/210–212, 324/537, 690, 693, 700, 702, 703, 705, 713, 324/718
See application file for complete search history.

(56) References Cited

U.S. PATENT DOCUMENTS

| | | | |
|---|---|---|---|
| 5,351,010 A * | 9/1994 | Leopold et al. ............ | 324/704 |
| 6,249,890 B1 | 6/2001 | Ukani et al. | |
| 6,265,885 B1 | 7/2001 | Luo et al. .................. | 324/719 |
| 6,400,519 B2 | 6/2002 | Mukoyama | |
| 6,400,534 B1 * | 6/2002 | Klaassen ................... | 360/323 |
| 6,642,714 B2 * | 11/2003 | Kobayashi et al. ......... | 324/252 |
| 6,710,594 B2 * | 3/2004 | Eunkyu et al. ............. | 324/210 |
| 6,822,815 B2 * | 11/2004 | Lim et al. .................. | 324/212 |
| 6,970,332 B2 * | 11/2005 | Tetsukawa et al. ........ | 360/324.1 |
| 6,989,974 B2 * | 1/2006 | Tetsukawa et al. ........ | 360/324.1 |
| 7,151,651 B1 | 12/2006 | Cross et al. ................ | 360/319 |
| 7,193,824 B2 * | 3/2007 | Naka ......................... | 360/324.2 |
| 7,317,597 B2 * | 1/2008 | Naka ......................... | 360/324.2 |
| 7,667,456 B2 * | 2/2010 | Naka ......................... | 324/210 |
| 2007/0230000 A1 | 10/2007 | Alex et al. ................. | 360/31 |
| 2008/0186023 A1 * | 8/2008 | Biziere et al. .............. | 324/252 |

OTHER PUBLICATIONS

U.S. Appl. No. 12/111,089, filed Apr. 28, 2008.
Non-Final Office Action Summary from U.S. Appl. No. 12/111,089 dated Oct. 19, 2010.
Non-Final Office Action Summary from U.S. Appl. No. 12/111,089 mailed on Sep. 8, 2010.
Non-Final Office Action Summary from U.S. Appl. No. 12/111,089 dated Jan. 31, 2011.
Notice of Allowance and Fee(s) Due from U.S. Appl. No. 12/111,089 dated May 5, 2011.

* cited by examiner

*Primary Examiner* — Timothy J Dole
(74) *Attorney, Agent, or Firm* — Zilka-Kotab, PC

(57) ABSTRACT

A method for detecting a damaged magnetoresistive sensor in one embodiment includes measuring a resistance of a first sensor upon application thereto of a positive bias current; measuring the resistance of the first sensor upon application thereto of a negative bias current; determining a difference in the measured resistances at positive and negative currents of the first sensor; measuring a resistance of a second sensor upon application thereto of a positive bias current; measuring the resistance of the second sensor upon application thereto of a negative bias current; determining a difference in the measured resistances at positive and negative currents of the second sensor; and outputting at least one of the differences, or a derivative of the at least one of the differences. Additional methods are also presented.

19 Claims, 20 Drawing Sheets

METHODS FOR DETECTING DAMAGE TO MAGNETORESISTIVE SENSORS

FIELD OF THE INVENTION

The present invention relates to data storage systems, and more particularly, this invention relates to detecting damage to magnetic sensors.

BACKGROUND OF THE INVENTION

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

Magnetic sensors, such as GMR sensors, are used extensively in the tape and hard disk industry. These sensors contain magnetic materials whose combined effect is to have a resistance change when subjected to a magnetic field. When subjected to low-level electrical overstress (EOS) or electrostatic discharge (ESD) current/voltage pulses, GMR sensors can be damaged. Also, corrosion can damage magnetic sensors over time, reducing their signal strength and possibly leading to failure. While GMR sensors have many metal layers, the resistance change from magnetic fields is associated with three layers: the free layer, the spacer layer, and a pinned layer. The orientation of the magnetization is fixed by an antiferromagnet (AFM) which is either a natural AFM or a synthetic antiferromagnet (SAFM), which is adjacent to the pinned layer. The resistance of the GMR sensor is determined by the vector dot product of the magnetization within the pinned layer and the free layer. One form of damage is when the magnetization of the pinned layer is reversed, which is associated with a a change in the in the set of films comprising the (S)AFM. The reversal or flip of the pinned layer magnetizations can occur when a sufficiently large current pulse, possibly from EOS or ESD, whose induced magnetic field opposes the magnetization in the (S)AFM and which heats the (S)AFM above it's blocking temperature. The result of the flip in the magnetizations of the films comprising the (S)AFM is a reverse magnetized pinned layer in the GMR sensor whose amplitude may be acceptable, but whose asymmetry is far from zero. In the reverse magnetized state, the sensor often will not function properly in a drive. Other EOS or ESD damage to the sensor can alter the magnetization orientation within the pinned layer or the (S)AFM which will alter the response of the GMR sensor to magnetic fields, either internally generated by current flow or externally generated.

Published approaches used to detect the flip in the magnetizations of the pinned layer or the (S)AFM involve removing the sensor from the drive and performing a tedious transfer curve utilizing an external magnet. This procedure is time consuming and costly.

Another EOS/ESD damage which occurs is complete damage of the sensor associated with interdiffusion of the metals in the multilayer GMR stack. Because some of the layers in the GMR sensor are very thin, the sensor resistance may hardly change despite the complete damage of the sensor's magnetic properties. Higher voltage or current ESD or EOS pulses will result in significant resistance changes, including complete melting of the sensor. Because resistance values for sensors used for hard disk or tape head storage products span a range as high as a factor of two, detecting ESD or EOS damage from pure resistance measurements is difficult, if not impossible.

Even in cases where diode protection against ESD or EOS events is used, a concern still exists that sufficiently high current pulses will damage heads. It is even possible that diode protection will result in protecting heads from severe ESD or EOS damage while at the same time resulting in some of the lower level ESD or EOS damages such as magnetic damage becoming more prevalent than ESD or EOS damage with high resistance changes. A diode functions by shunting current in parallel with the sensor. The fraction of the total current which passes through the sensor is the ratio of the diode "on-resistance" divided by the sum of the diode on-resistance and the sensor resistance. Ultimately, at a high enough current, the sensor will be damaged. With diode protection, there is a potential of shifting the higher level damage such as melting of the sensor or interdiffusion of metals to lower level damage associated with magnetic damage such as the creation of magnetic domains or the flipping of the polarity of the (S)AFM or pinned layer magnetizations, so the more difficult to detect magnetic damage is more prevalent than the severe, and more easily detectable, physical damage. Thus, a method to detect magnetic damage from ESD events is needed, even when diode protection is utilized.

Another damage to GMR sensors is corrosion. The corrosion of the sensor may only affect a thin layer of the sensor perpendicular to the plane of the metal stacks (stripe). In the case of mild corrosion, the resistance of the sensor may increase substantially (5 to 10% or more) due to the conversion of one or more of the metal films being oxidized in a thin layer of the sensor (5 to 10% or more of into the depth of the sensor stripe) while not affecting the deeper portion of the metal layers. The unaffected metal layers may then function normally as a GMR sensor so that the loss in the GMR response of the sensor is confined only to the surface of the sensor near the tape bearing surface (TBS). Thus, corrosion may be associated with a significant decrease in the resistance of the GMR sensor (5 to 10% or more) while still maintaining a GMR response to a magnetic field which is comparable to the unaffected GMR sensor.

SUMMARY OF THE INVENTION

A method for detecting a damaged magnetoresistive sensor in one embodiment comprises measuring a resistance of a first sensor upon application thereto of a positive bias current; measuring the resistance of the first sensor upon application thereto of a negative bias current; determining a difference in the measured resistances at positive and negative currents of the first sensor; measuring a resistance of a second sensor upon application thereto of a positive bias current; measuring the resistance of the second sensor upon application thereto of a negative bias current; determining a difference in the measured resistances at positive and negative currents of the second sensor; and outputting at least one of the differences, or a derivative of the at least one of the differences.

A method for detecting a damaged magnetoresistive sensor in another approach includes measuring resistances of a plurality of sensors at least a first bias current level; determining whether one of the sensors has a resistance that is at least a predetermined amount higher or lower than the resistances of the other sensors; and outputting an indication that the one of the sensors has a resistance that is at least a predetermined amount higher than the resistances of the other sensors.

A method for detecting a damaged magnetoresistive sensor in a further embodiment comprises determining a scaled resistance of a plurality of sensors; wherein the scaled resistances are measured against the current $I_{mr}$ or against the square of the current, $I^2_{mr}$; and outputting a representation of the measurements.

A method for detecting a damaged magnetoresistive sensor in a further embodiment comprises determining thermal conductances of a plurality of sensors, where thermal conductance is defined as the change in sensor stripe resistance as a result of Joule heating of the stripe, divided by the product of the Joule heating power in the sensor stripe times the change in stripe resistance per unit temperature rise; determining a resistance value of each of the sensors; and outputting an indication that one of the sensors has at least one of: a thermal conductance that is at least a predetermined amount different than the thermal conductances of the other sensors, and a resistance value that is at least a predetermined amount different than the resistance values of the other sensors.

Any of these embodiments may be implemented in conjunction with a magnetic data storage system such as a tape drive system, which may include a magnetic head as recited above, a drive mechanism for passing a magnetic medium (e.g., recording tape) over the magnetic head, and a controller electrically coupled to the magnetic head.

Embodiments of the present invention may also suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Other aspects, advantages and embodiments of the present invention will become apparent from the following detailed description, which, when taken in conjunction with the drawings, illustrate by way of example the principles of the invention.

DETAILED DESCRIPTION

Figure 1:
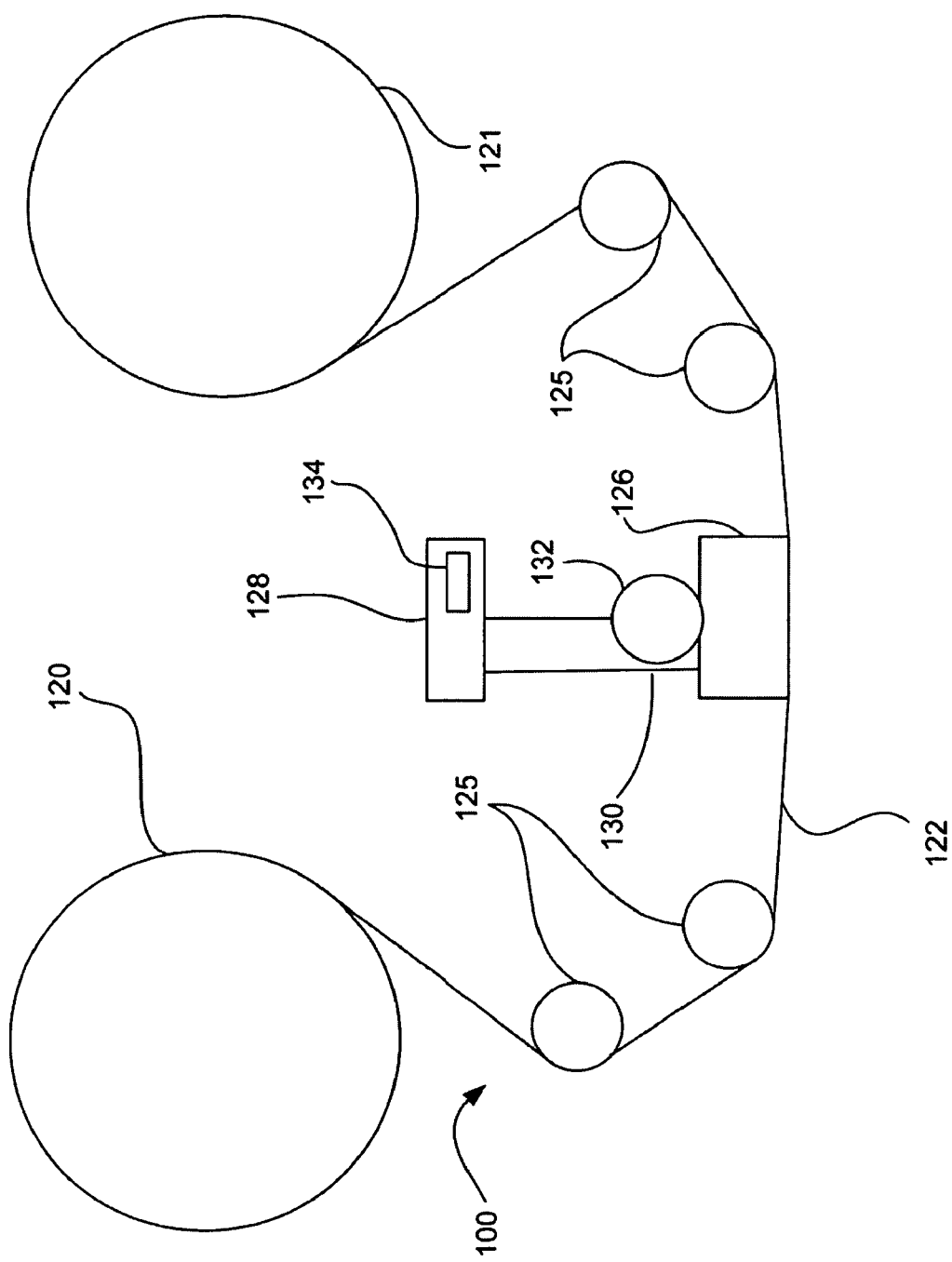
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The term "ambient temperature" as used herein refers to the temperature of the environment in which any physical or chemical event occurs, unless otherwise specified. The term "at" or "near" "ambient temperature" as used herein refers to the temperature of the environment in which any physical or chemical event occurs plus or minus ten degrees, alternatively, five degrees, alternatively, three degrees, alternatively two degrees, and alternatively, one degree, unless otherwise specified. A typical range of ambient temperatures is between about 0° C. and about 40° C., though ambient temperatures could include temperatures that are higher or lower than this range.

In one general embodiment, a method for detecting a damaged sensor comprises measuring a resistance of a first sensor upon application thereto of a positive bias current, measuring the resistance of the first sensor upon application thereto of a negative bias current, determining a difference in the measured resistances of the first sensor, measuring a resistance of a second sensor upon application thereto of a positive bias current, measuring the resistance of the second sensor upon application thereto of a negative bias current, determining a difference in the measured resistances of the second sensor, and outputting at least one of the differences, or a derivative of the at least one of the differences.

In another general embodiment, a method for detecting a damaged sensor comprises measuring resistances of a plurality of sensors at least a first bias current level, determining whether one of the sensors has a resistance that is at least a predetermined amount higher than the resistances of the other sensors, and outputting an indication that one of the sensors has a resistance that is at least a predetermined amount higher than the resistances of the other sensors.

In another general embodiment, a method for detecting a damaged sensor comprises determining thermal conductances of a plurality of sensors, determining a resistance value of each of the sensors, and outputting an indication that one of the sensors has at least one of two characteristics. The two characteristics are: a thermal conductance that is at least a predetermined amount different than the thermal conductances of the other sensors; and a resistance value that is at least a predetermined amount different than the resistance values of the other sensors.

In another general embodiment, a method for detecting a damaged magnetoresistive sensor includes measuring resistances of a plurality of sensors at least a first bias current level; determining whether one of the sensors has a resistance that is at least a predetermined amount higher or lower than the resistances of the other sensors; and outputting an indication that the one of the sensors has a resistance that is at least a predetermined amount higher than the resistances of the other sensors.

In another general embodiment, a method for detecting a damaged magnetoresistive sensor in a further embodiment comprises determining a scaled resistance of a plurality of sensors; wherein the scaled resistances are measured against the current $I_{mr}$ or against the square of the current, $I^2_{mr}$; and outputting a representation of the measurements.

In another general embodiment, a method for detecting a damaged magnetoresistive sensor in a further embodiment comprises determining thermal conductances of a plurality of sensors, where thermal conductance is defined as the change in sensor stripe resistance as a result of Joule heating of the stripe, divided by the product of the Joule heating power in the sensor stripe times the change in stripe resistance per unit temperature rise; determining a resistance value of each of the sensors; and outputting an indication that one of the sensors has at least one of: a thermal conductance that is at least a predetermined amount different than the thermal conductances of the other sensors, and a resistance value that is at least a predetermined amount different than the resistance values of the other sensors.

In another general embodiment, a method for detecting a damaged magnetoresistive sensor includes analyzing readback signals of a plurality of sensors each being positioned over data tracks on a passing magnetic medium; determining whether at least one of the readback signals is out of phase with respect to the other readback signals, and/or whether at least one of the readback signals has a significantly lower amplitude that the other readback signals.

In another general embodiment, a method for detecting a damaged magnetoresistive sensor includes measuring a median DiffPN value of a group of GMR sensors on a module, the sensors characterized as having been deposited on a same wafer and having been lapped as a single unit; comparing the DiffPN values to the median; determining that at least one of physical and magnetic damage has occurred to an individual sensor if the difference in the DiffPN value of the individual sensor from the median is greater than a statistically predetermined value for the group of sensors; where the difference is at least one times the average of the standard deviations of a large number of normal modules or the average of the standard deviations of a large number of modules, wherein at least the largest and the smallest DiffPN value within the module is not included in the calculation of the module's standard deviation.

In another general embodiment, a method for detecting a damaged magnetoresistive sensor includes measuring DiffPN values of all GMR sensors on a module where a module contains a multiplicity of GMR sensors deposited on the same wafer and which have been lapped as a single unit; fitting the DiffPN values versus sensor position within the array of sensors to a polynomial, wherein at least one of either the largest DiffPN values or at least one of the smallest DiffPN is not included in the fitting; determining a difference in the DiffPN value for each individual sensor to the polynomial fit; calculating a standard deviation of the group of DiffPN values from the polynomial fit values; performing a second polynomial fit with all DiffPN values that are within a predetermined value of the first polynomial fit; using the second polynomial fit for determining the deviation of each individual DiffPN value from the second polynomial fit; and wherein any sensor which is 1, 2, 3 or more standard deviations from the projected value is determined to be damaged.

A giant magnetoresistance sensor (GMR) is a multi-layered sheet of metals which has the characteristic that the sensor resistance varies with the application of a magnetic field. The applied magnetic field can either be from an external source or from an internal source, such as the currents through the metals in the GMR stripe. The resistance change from magnetic fields is associated with three layers: the free layer, the spacer layer, and a pinned layer. The orientation of the magnetization is fixed by an antiferromagnet (AFM) which is either a natural AFM or a synthetic antiferromagnet (SAFM), which is adjacent to the pinned layer. The resistance of the GMR sensor is determined by the vector dot product of the magnetization within the pinned layer and the free layer.

When a magnetic sensor, for example a GMR sensor, is damaged by high current electrical overstress (EOS) or electrostatic discharge (ESD) pulses, the resistance of the GMR sensor can increase. For a common head which has multiple sensors which are lapped simultaneously, the high resistance changes can be determined by comparing the values of the neighboring sensors. One can use different techniques such as excluding the several of the highest resistance values and/or several of the lowest resistance values, fitting the remaining resistance values to a polynomial (order 1 or 2 generally work best; i.e., linear or quadratic) and then projecting to all the parts and excluding the parts which vary by a variance from a projected value, such as some multiple X of the average standard deviation of a group of good parts. This suggested technique in no way limits any other techniques which may be used.

For example, two other techniques which will give more accurate information on the state of the sensor are to measure the resistance of the sensor at several bias currents, including forward and reverse bias currents. The current passing through the sensor at forward and reverse bias currents generates a magnetic field within the GMR sensor magnetic free layer in reverse directions. Since the GMR sensors are designed to change their resistance linearly with the vector dot product between the applied magnetic field in the free layer and the pinned layer, the difference in resistance between forward and reverse bias current can be a direct indication of the integrity of the GMR sensor. In fact, in the case of shielded GMR sensors, the field generated within the sensor may be a better indicator of the sensor integrity than the application of an external magnetic field from a uniform magnetic field because the effects of large magnetic fields on the shields are minimized. Also, ESD events can flip the magnetic orientation within the pinned layer by affecting the magnetization within the antiferromagnet (AFM). The sign of the difference in resistance for forward and reverse bias currents will change if the pinned layer orientation is flipped due to an ESD event. Any of these measurements can be done in the absence of a magnetic testing device, which reduces the cost of sensor integrity testing. These methods can also be used in conjunction with a magnetic testing device to supply additional information not available with a magnetic testing device alone. Another means of detecting the state of the AFM is to look at the polarity of the magnetic response using known transitions on the magnetic storage media.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
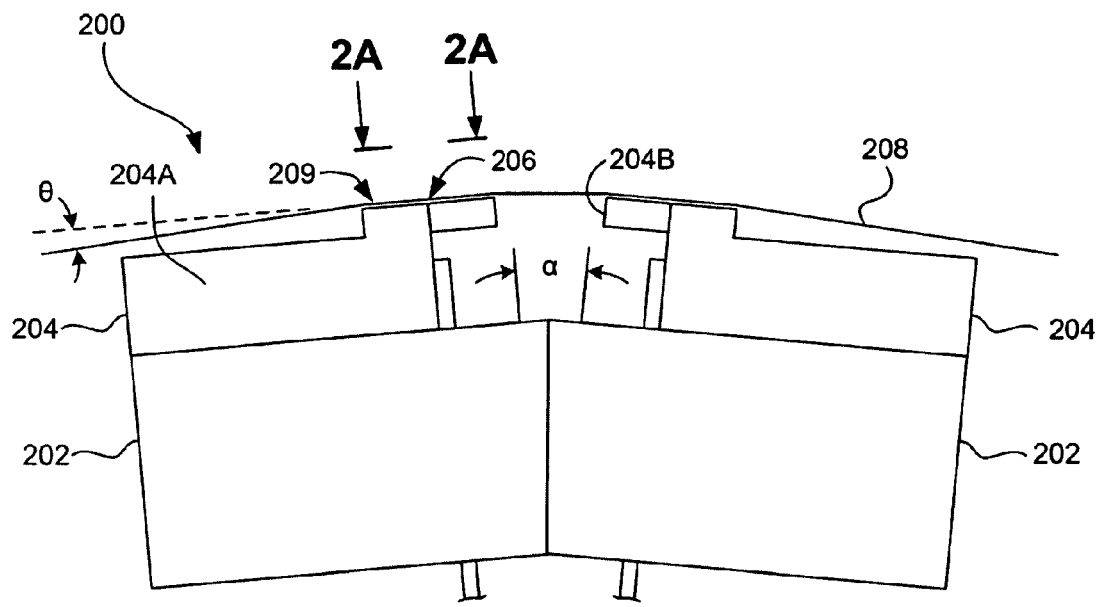
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap 206 comprising readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
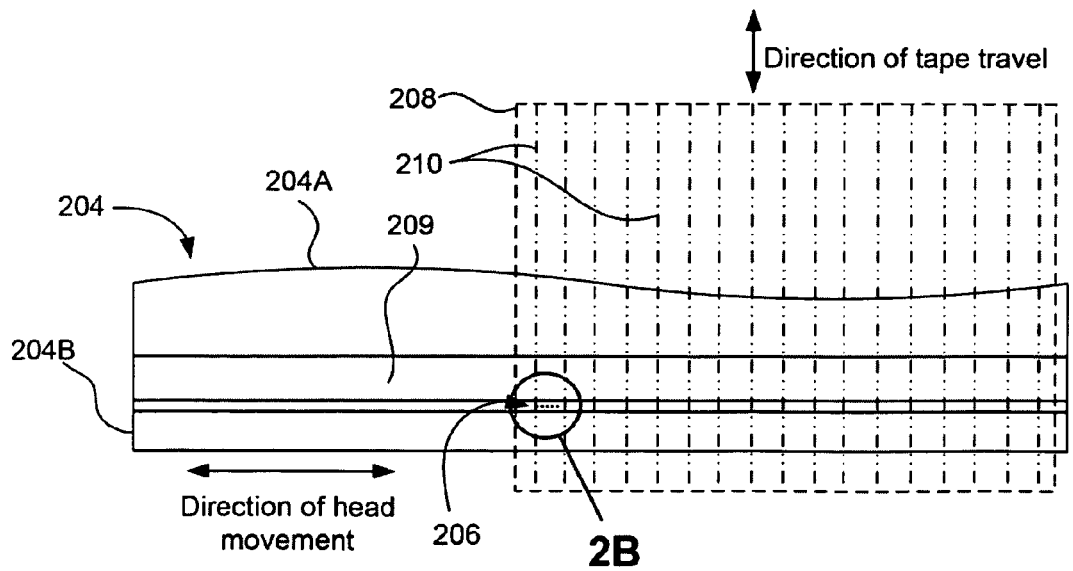
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 12-22 data bands, e.g., with 16 data bands and 17 servo tracks 210, as shown in FIG. 2A on a one-half inch wide tape 208. The data bands are defined between servo tracks 210. Each data band may include a number of data tracks, for example 96 data tracks (not shown). During read/write operations, the elements 206 are positioned within one of the data bands. Outer readers, sometimes called servo readers, read the servo tracks 210. The servo signals are in turn used to keep the elements 206 aligned with a particular track during the read/write operations.

Figure 2B:
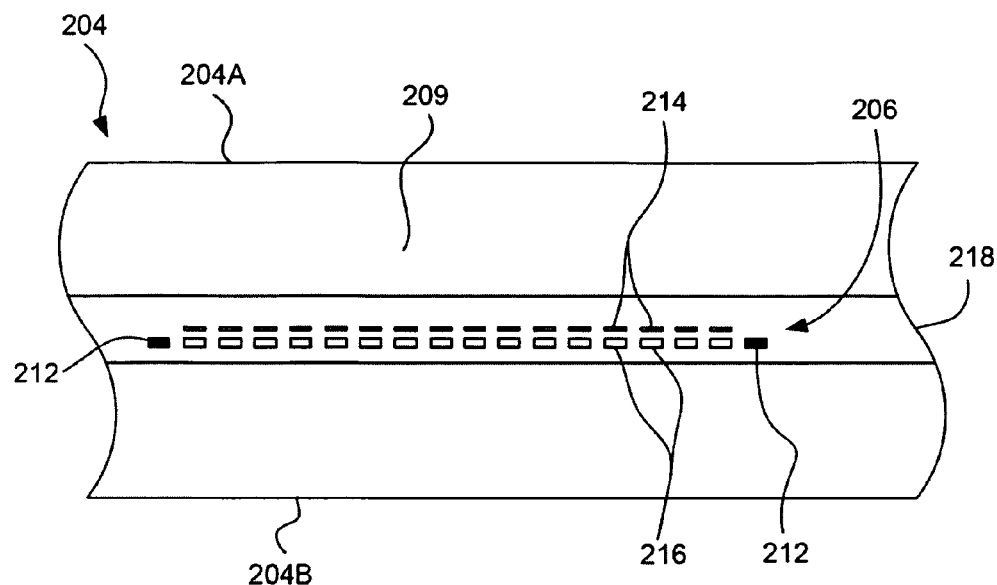
FIG. 2B is a detailed view taken from Circle 2B of FIG. 2A.

FIG. 2B depicts a plurality of read and/or write elements 206 formed in a gap 218 on the module 204 in Circle 2B of FIG. 2A. As shown, the array of elements 206 includes, for example, 16 writers 214, 16 readers 216 and two servo readers 212, though the number of elements may vary. Illustrative embodiments include 8, 16, 32, and 40 elements per array 206. A preferred embodiment includes 32 readers per array and/or 32 writers per array. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of elements 206 may be readers or writers only, and the arrays may contain one or more servo readers 212. As noted by considering FIGS. 2 and 2A-B together, each module 204 may include a complementary set of elements 206 for such things as bi-directional reading and writing, read-while-write capability, backward compatibility, etc.

Figure 2C:
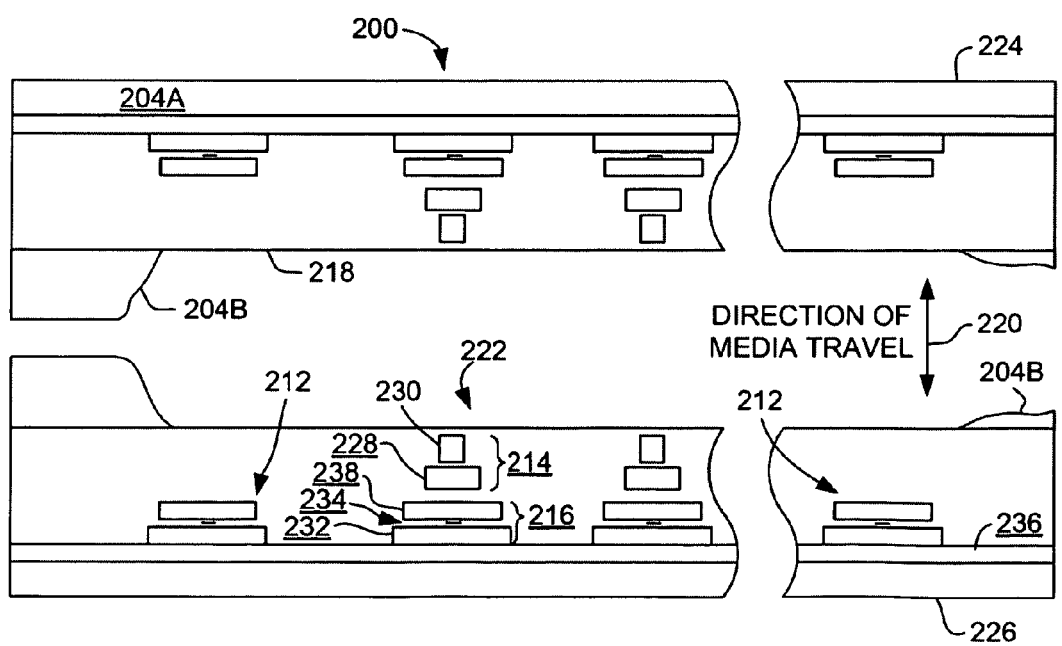
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
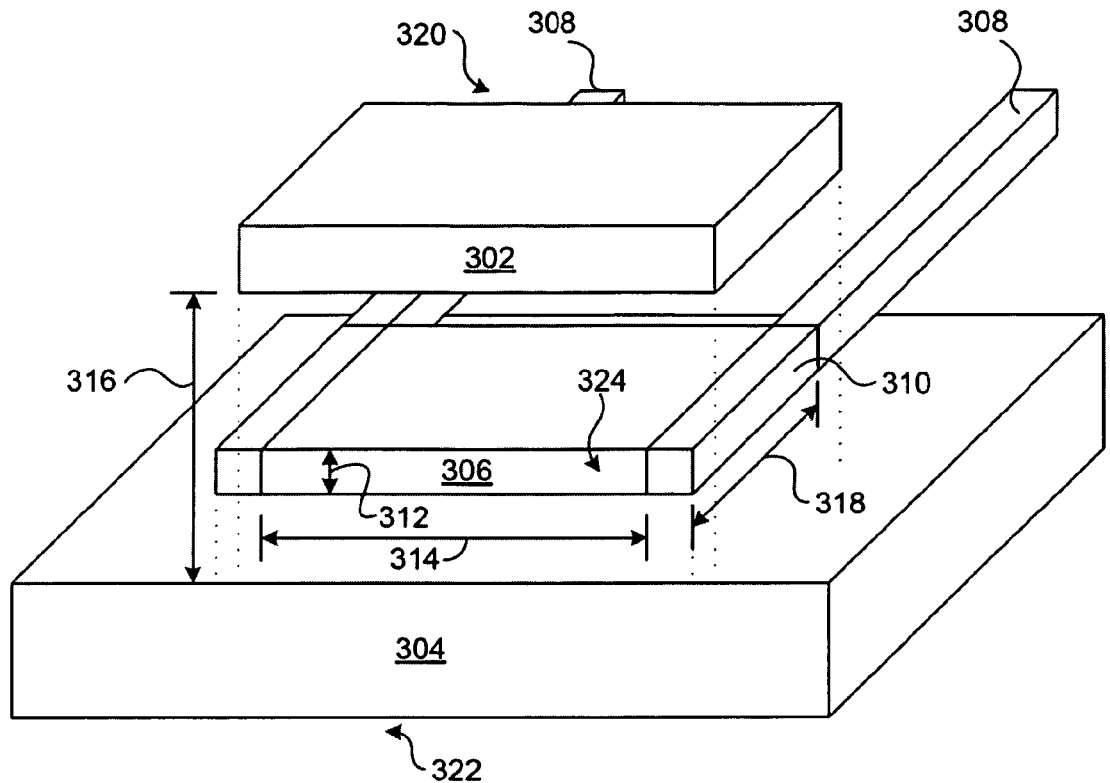
FIG. 3 is a schematic diagram of a current-in-plane (CIP) read-sensor which may be used in conjunction with various embodiments.

FIG. 3 is a schematic diagram of a current-in-plane (CIP) read-sensor which may be used in conjunction with various embodiments. The sensor stripe 306 is between a first shield 304 and a second shield 302. The sensor stripe 306 has multiple layers but is here depicted as a single sheet. Leads 308 extend from the sensor stripe 306 so that an electrical connection can be made. The sensor stripe 306 has dimensions of width 314, thickness 312, and height 318. Also, the there typically is a gap 316 between the first shield 304 and second shield 302. The sensor stripe may have a hard bias magnet 310 on either edge of the sensor stripe 306 toward the leads 308. Below the first shield 304 is the undercoat 322, and above the second shield 302 is an overcoat 320.

Figure 4A:
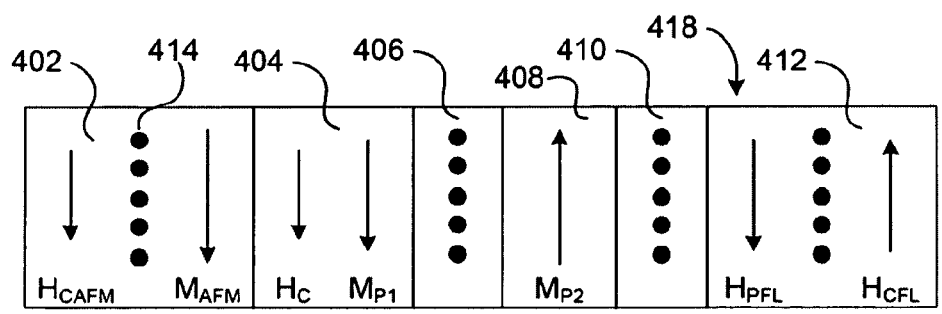
FIG. 4A is a schematic diagram of the current flow through a generic GMR stack when a forward (positive) bias current is applied.

FIG. 4A is a schematic diagram of the current flow through a generic GMR stack and the associated magnetic fields as viewed along a slice in the stack when a forward (positive) bias current is applied. It should be noted that a bias current is simply a current passed through the sensor, and no special characteristics or requirements should be attributed to the bias currents described herein unless otherwise noted. The vertical axes are in the stripe height orientation and the horizontal axes are in the stripe thickness orientation. The track width is into the page and the tape-bearing surface 418 (TBS) is at the top of the figure. The darkened circle represents current flow 414 out of the page. The magnetic field in the antiferromagnet (AFM) layer 402 at the interface with the adjacent ferromagnetic layer 404 is represented by $M_{AFM}$ on FIG. 4A and is assumed to be vertical. $M_{AFM}$ could be the net field in the AFM or the field at the interface of the first pinned layer (PL$_1$) $M_{AFM}$ forces the magnetization ($M_{P1}$) in the first pinned layer 404 to also be in the vertical direction. The spacer layer 406 separates the second pinned ferromagnetic layer 408 from the pinned layer 404, and the proper thickness and coupling between the pinned layer 404 and the second pinned ferromagnetic layer (PL$_2$) 408 results in the magnetization in the second pinned ferromagnetic layer 408 ($M_{P2}$) to be reverse-aligned with $M_{P1}$. The layers described create a synthetic antiferromagnet (SAFM). A copper layer 410 separates the SAFM from the free layer (FL) 412. The combination of magnetizations in the SAFM creates a magnetization ($H_{PFL}$) in the free layer 412, which is arbitrarily shown in the vertical orientation in FIG. 4A. The bias current flow ($I_{bias}$) in the stack generates a magnetic field in the AFM layer 402 of $H_{CAFM}$ and in the free layer 412 of $H_{CFL}$. For forward bias current flow 414, $H_{CAFM}$ is aligned with $M_{AFM}$ and $H_C$ is aligned with $M_{P1}$, and $H_{CFL}$ is reverse-aligned with $H_{PFL}$. Since, to first order, the resistance of the GMR sensor varies as the cosine of the angle between the magnetization in the PL$_2$ and the FL, forward bias currents result in a slightly lower resistance in the sensor due to the GMR effect.

Figure 4B:
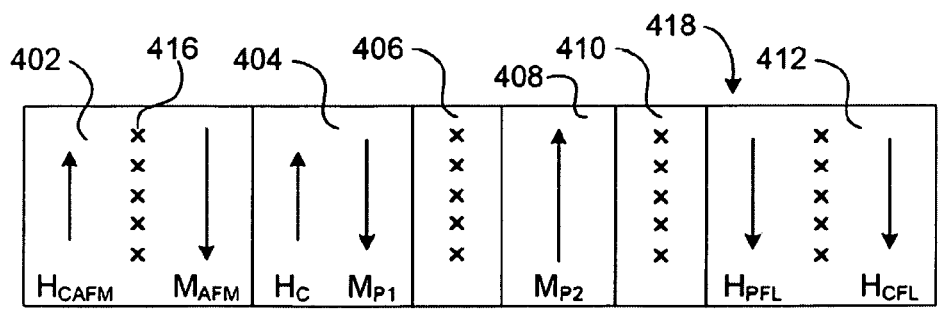
FIG. 4B is a schematic diagram of the current flow through a generic GMR stack when a reverse (negative) bias current is applied.

FIG. 4B is a schematic diagram of the current flow through a generic GMR stack and the associated magnetic fields as viewed along a slice in the stack when a reverse (negative) bias current is applied. It should be noted that a bias current is simply a current passed through the sensor, and no special characteristics or requirements should be attributed to the bias currents described herein unless otherwise noted. All the definitions from FIG. 4A apply here, and instead of darkened circles, FIG. 4B has x's which indicate negative bias current flow 416, which is into the page. The combination of magnetizations in the SAFM creates a magnetization ($H_{PFL}$) in the free layer 412, which is arbitrarily shown in the vertical orientation in FIG. 4B. The bias current flow ($I_{bias}$) in the stack generates a magnetic field in the AFM layer 402 of $H_{CAFM}$ and in the free layer 412 of $H_{CFL}$. For reverse bias current flow 416, $H_{CAFM}$ is reverse-aligned with $M_{AFM}$, $H_C$ is reverse-aligned with $M_{P1}$, and $H_{CFL}$ is aligned with $H_{PFL}$. Since, to first order, the resistance of the GMR sensor varies as the cosine of the angle between the magnetization in the PL$_2$ and the FL, reverse bias currents result in a slight increase in the sensor resistance due to the GMR effect.

Figure 5:
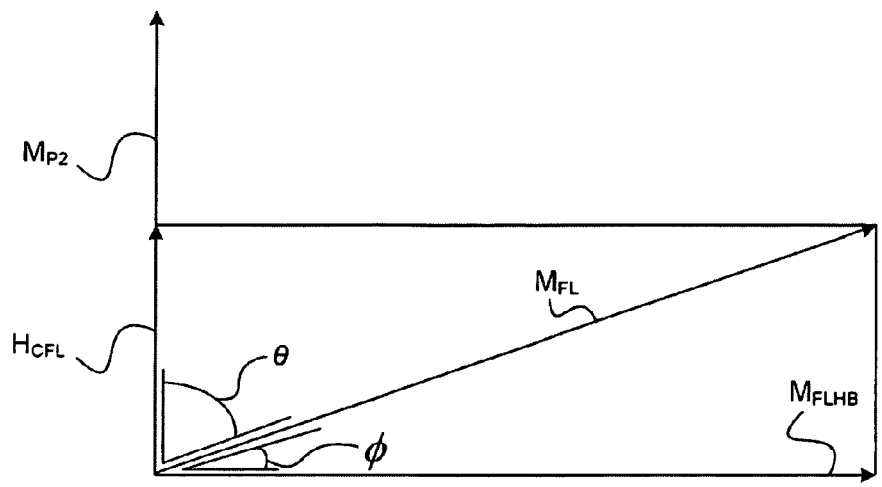
FIG. 5 is a schematic diagram of the net magnetization inside the free layer of a generic GMR stack.

FIG. 5 is a schematic diagram of the net magnetization ($M_{FL}$) inside the free layer (412 on FIG. 4A) for a forward biased sensor stripe formed by the vector sum of the magnetizations from the hard bias magnets ($M_{FLHB}$) and free layer magnetization $H_{CFL}$. Also shown is the orientation of the magnetization ($M_{P2}$) in the second pinned layer (408 in FIG. 4A). The magnetization in the free layer caused by the SAFM ($H_{PFL}$) is not shown since it is difficult to predict.

FIGS. 3-5 can now be used to more fully understand the following descriptions of several embodiments.

Steady State Thermal Conductance

While forward bias currents result in slightly lower resistance than for reverse bias currents in the sensor due to the GMR effect, since the current passing through the thin sensor also heats the sensor up due to Joule heating and the positive change in resistance with temperature, the combined effects of heating and the GMR effect from the magnetic field generated by the bias current must be taken into account. As will be shown later, for a given current, the difference in the resistance measured with forward and reverse bias currents are, to first order, related to the GMR effect, while the sum of the two resistances is dominated by the Joule heating effect.

The rise in stripe temperatures were calculated by measuring the stripe resistance ($R_{mr}$) with the lead and hard-bias resistances ($R_{lead}$) removed in the following equations.

$$R_{mr}(\Delta T_{mr}) = R_{mro}[(1 + \alpha_{mr} * \Delta T_{mr}) - \delta_{gmr}(\Delta T_{mr})\cos(\theta)] \quad \text{Equation 1A}$$

$$\delta_{gmr}(\Delta T_{mr}) = \delta_{gmro}(1 - \Delta T_{mr}/T_C)^{0.5} \quad \text{Equation 1B}$$

$$R_{mr} = R_{total} - R_{lead} \quad \text{Equation 1C}$$

$$R_{mro} = R_{sheet} * W/H \quad \text{Equation 1D}$$

Equation 1C gives the GMR stripe resistance ($R_{mr}$), which is determined by subtracting the lead-hard-bias resistance ($R_{lead}$) from the total measured resistance ($R_{total}$). Equation 1D gives the MR stripe resistance ($R_{mro}$) at ambient temperature and low bias current in terms of the stripe sheet resistance ($R_{sheet}$) and the rectangular properties of the stripe width (W) and height (H). The GMR stripes are made from stacks of metals deposited on a wafer with well known values for W and $R_{sheet}$. The fabrication process includes polishing (lapping) a smooth TBS, which results in a given value of H for each sensor, which usually has a wide tolerance range for manufactured parts. H, then can be determined from the measured value of $R_{mro}$ using the known values of W and $R_{sheet}$ with Equation 1D.

The first term in Equation 1A is the standard temperature dependence of the stripe resistance, with $\alpha_{mr}$ measured to be in the range of about 0.001 to about 0.002° $C.^{-1}$ for extant GMR sensors, and $R_{sheet}$ is of the order of 10 to 25 Ω/sq. $\Delta T_{mr}$ is the temperature rise above ambient temperature (e.g., about 25° C.). The second term in Equation 1A is the GMR component to the resistance with $\delta_{gmr}(\Delta T_{mr})$ being the temperature dependent fractional GMR resistance when the pinned layer ($M_{PL}$) and the free layer ($M_{FL}$) magnetizations are anti-parallel, and θ (from FIG. 5) is the angle between $M_{P2}$ and $M_{FL}$ ($\theta = \pi/2 + \phi$ in FIG. 5). Equation 1B gives a phenomenological formula for the temperature dependence of $\delta_{gmr}$ ($\Delta T_{mr}$). Extant GMR sensors have a $\delta_{gmro}$ nominally of around 5 to 15% at room temperature ($\Delta T_{mr} = 0$). In Equation 1B, $T_C$ is a temperature, which experimentally is determined to be about 425° C. for a given sensor. H and W are the stripe height 318 and the track width 314 as indicated in FIG. 3.

In normal operation, $M_{P2}$ and $M_{FL}$ are designed to be almost perpendicular. The deviation from perpendicularity is due to the rotation of $M_{FL}$ by $M_{P1}$ ($\phi_{PL}$) and the magnetic field generated by the bias current ($H_{CFL}$). It should be noted that a bias current is simply a current passed through the sensor, and no special characteristics or requirements should be attributed to the bias currents described herein unless otherwise noted. $H_{cFL}$ is given by Equation 2.

$$H_{cFL} = \epsilon I_{mr} M_{FLHB} \quad \text{Equation 2}$$

The angle θ, then, is given by Equation 3.

$$-\cos(\theta) = \sin(\phi) \sim -\epsilon I_{mr} \quad \text{Equation 3}$$

The stripe temperature rise versus bias current ($I_{mr}$) is assumed to be proportional to the power in the stripe:

$$\Delta T_{mr} = \frac{R_{mr}(\Delta T_{mr})I_{mr}^2}{\kappa_{mr}} \quad \text{Equation 4}$$

$\kappa_{mr}$, termed the thermal conductance, completely defines the sensor Joule heating. Combining Equation 1 through Equation 4 yields the following.

$$\Delta T_{mr} = \frac{(\gamma_{mr}/\alpha_{mr})I_{mr}^2(1 - \epsilon\delta_{gmr}I_{mr})}{1 - \gamma_{mr}I_{mr}^2} \quad \text{Equation 5A}$$

$$R_{mr} = \frac{R_{mro}(1 - \epsilon\delta_{gmr}I_{mr})}{1 - \gamma_{mr}I_{mr}^2} \quad \text{Equation 5B}$$

Where, $$\kappa_{mr} = \frac{\alpha_{mr}R_{mr}(I_{mr}=0)}{\gamma_{mr}} \quad \text{Equation 5C}$$

Since $\delta_{gmr}$ is a function of temperature, in Equations 5A-5B, $\delta_{gmr}$ is a function of $I_{mr}$. For small currents, $\delta_{gmr}$ can be treated as a constant. For higher currents, with large temperature changes, Equations 5A-5B must be solved numerically. Equation 5B can be transformed into a linear equation by first defining a scaled function:

$$R_{scale}(I_{mr}) = [R_{mr}(I_{mr}) - R_{mr}(I_{mr}=0)]/R_{mr}(I_{mr}) \quad \text{Equation 6}$$

Then $R_{mr}(I_{mr})$ and $R_{mr}(-I_{mr})$ are combined to form Equation 7.

$$R_{mrC}(I_{mr}) = \frac{R_{mr}(I_{mr}) + R_{mr}(-I_{mr})}{2} = \frac{R_{mro}}{1 - \gamma_{mr}I_{mr}^2} \quad \text{Equation 7}$$

Replacing $R_{hot}$ by $R_{mrC}$ in Equation 7 yields Equation 8.

$$R_{scaleC}(I_{mr}) = \frac{R_{mrC}(I_{mr}) - R_{mrC}(I_{mr}=0)}{R_{mrC}(I_{mr})} \gamma_{mr}I_{mr}^2 \quad \text{Equation 8}$$

Figure 6:
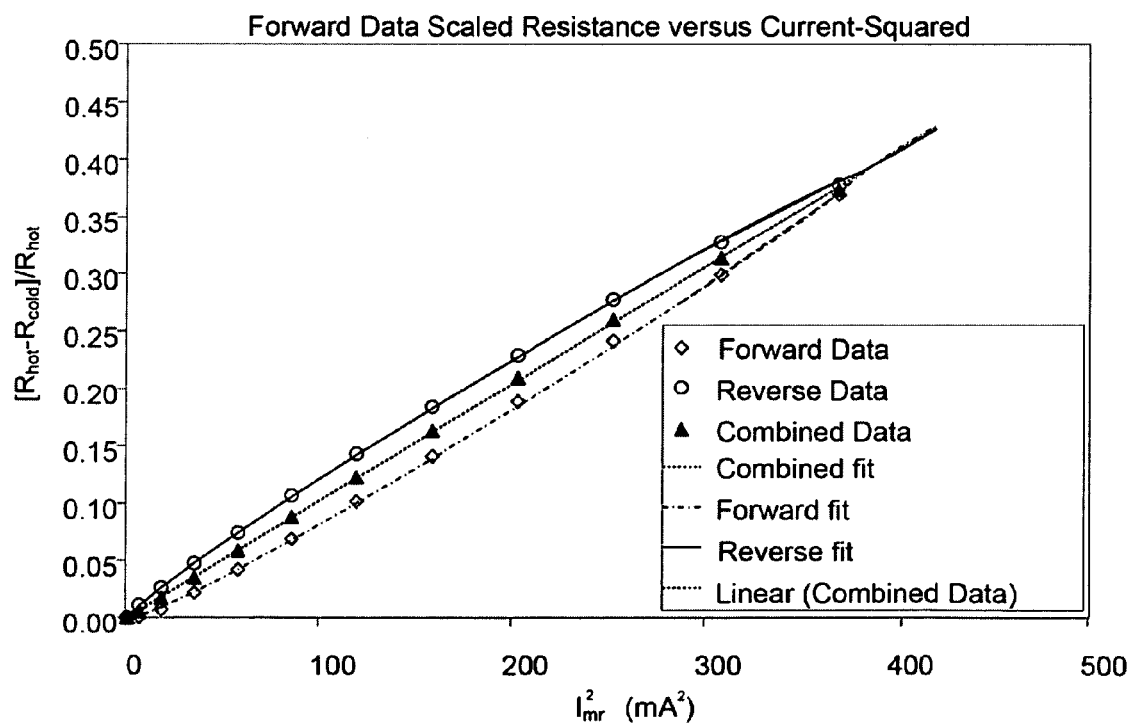
FIG. 6 is a plot of the scaled resistance ($R_{scale}$) versus current ($I^2_{mr}$) with best fit lines indicating forward data, reverse data, combined data, and a linear relationship.

FIG. 6 shows a plot of $R_{scale}$ versus $I^2_{mr}$ using $R_{mrC}(I_{mr})$, $R_{mr}(I_{mr})$ and $R_{mr}(-I_{mr})$ for $R_{hot}(I_{mr})$ with $\delta_{gmro} = 0.13$, $\epsilon = 0.025$/mA and $T_C = 425°$ C. ε is an experimentally determined value which quantifies the strength of the magnetic field generated in the free layer per unit of current. There are four best fit lines on the plot indicating forward data, reverse data, combined data, and a linear relationship that closely fits with the combined data line.

Figure 7:
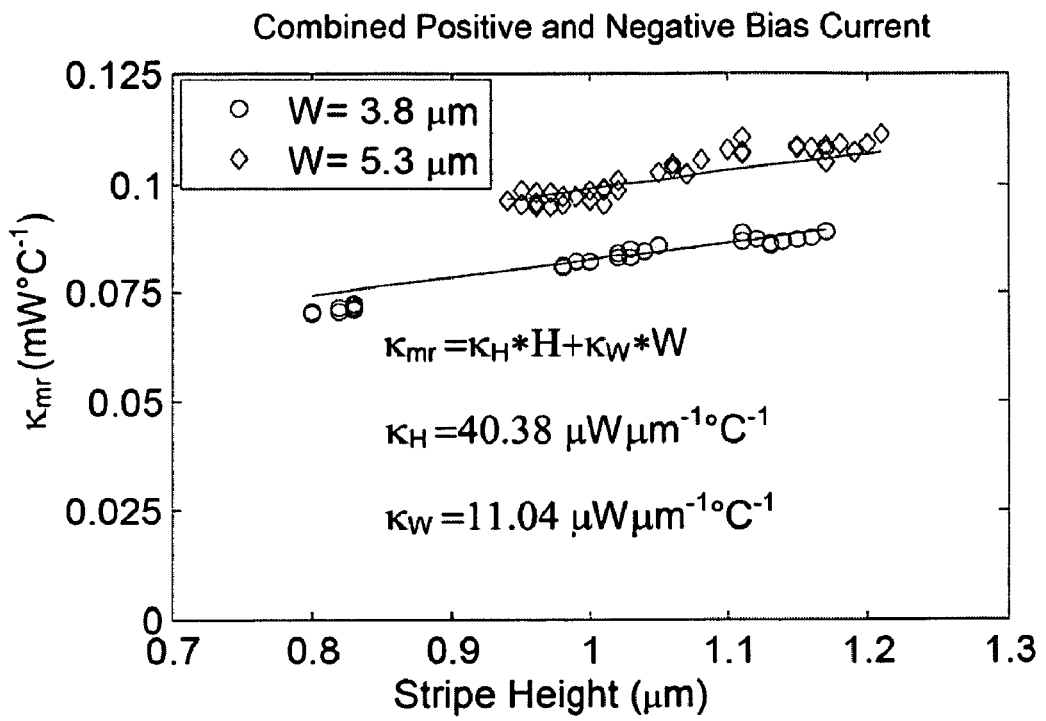
FIG. 7 is a plot of the second order equation fits from Equation 9.

$\kappa_{mr}$, derived from data using Equation 8 and Equation 5C, is fit to a second order equation in stripe height H and track width W.

$$\kappa_{mr} = \kappa_{equ} = \kappa_W W + \kappa_H H \quad \text{Equation 9}$$

where $\kappa_{equ}$ is the equilibrium form of $\kappa_{mr}$. The second order equation fits are shown in FIG. 7, where $\kappa_W = 11.04$ μW/μm/° C. and $\kappa_H = 40.38$ μW/μm/° C.

When the stripes are exposed to elevated temperatures, the resistance can change due to irreversible thermodynamic processes (such as metal diffusion or electromigration), while $\kappa_{mr}$ will remain constant. Thus, during thermal stress testing, the temperature is determined using the parameter $\kappa_{mr}$ and the measured power in the sensor stripe. The benefit of using $\kappa_{mr}$ is the well defined relationship between the thermal conductance and H and W. Taking W as a known value, and taking the $\kappa_{mr}$ value determined as described above, and using the H value determined from Equation 1D, and using the relationship for $\kappa_{mr}$ versus H given in Equation 9, the expected value of $\kappa_{mr}$ and H can be predicted for a part with a given resistance. A part which has a value of $\kappa_{mr}$ which is outside a statistically determined value based on it's H can be determined to be damaged.

GMR Amplitude and SAFM Flip Using Resistance

The functions of resistance ($R_{scale}$, $R_{scaleC}$, and $R_{mrC}$) are useful in determining different parameters of the sensor. Another resistance function, $R_{scaleD}(I_{mr})$, is useful because it directly gives the GMR sensitivity of the sensor. Defining $R_{mrD}$ as the difference in the resistance measured with positive and negative bias current results in Equation 10.

$$R_{mrD}(I_{mr}) = \frac{R_{mr}(-I_{mr}) - R_{mr}(I_{mr})}{2}$$ Equation 10

$$= \frac{\varepsilon \delta_{gmr} I_{mr} R_{mro}}{1 - \gamma_{mr} I_{mr}^2}$$

$$= \varepsilon \delta_{gmr} I_{mr} R_{mrC}(I_{mr})$$

where the GMR sensitivity can be determined by defining the function $R_{scaleD}(I_{mr})$ in Equation 11.

$$R_{scaleD}(I_{mr}) = \frac{R_{mrD}(I_{mr})}{I_{mr} R_{mrC}(I_{mr})} = \varepsilon \delta_{gmr}$$ Equation 11

Values of 0.021 mA$^{-1}$ for $\varepsilon$ and 8% for $\delta_{gmr}$ were used to fit the data.

The polarity of the signal $P_{Rmr}$ for positive versus negative bias current is useful to determine whether the magnetizations of the SAFM are properly aligned or reverse-aligned:

$P_{Rmr} = +1$ if $R_{mr}(-I_{mr}) - R_{mr}(I_{mr}) > 0$   Equation 12A $P_{Rmr} = -1$ if $R_{mr}(-I_{mr}) - R_{mr}(I_{mr}) < 0$   Equation 12B For most designs a $P_{Rmr}$ of +1 is chosen. If $P_{Rmr}$ of -1 is measured, then the magnetizations of the SAFM are reverse-aligned, most likely because of damage from an EOS or an ESD pulse, or possibly from stress induced flipping of the magnetization of the pinned layers and or (S)AFM.

Further Data on a Damaged Sensor

FIGS. 8-12 graphically display data for a head having undamaged sensors. In the data, the resistance changes behave as expected, and can be fit with the model described above. Also, the values of the parameters used to fit the data have a tight distribution.

Figure 8:
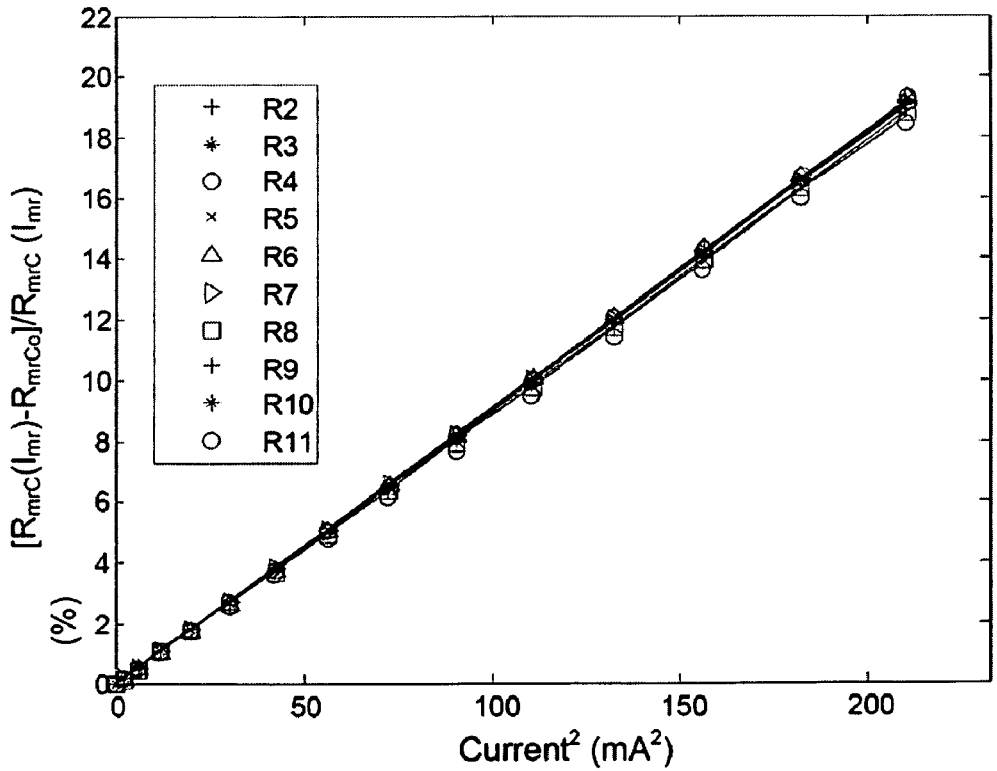
FIG. 8 is a plot of experimentally obtained data showing the scaled resistance ($R_{scale}$) versus current squared ($I^2_{mr}$) for 10 sensors on one module.
Figure 9:
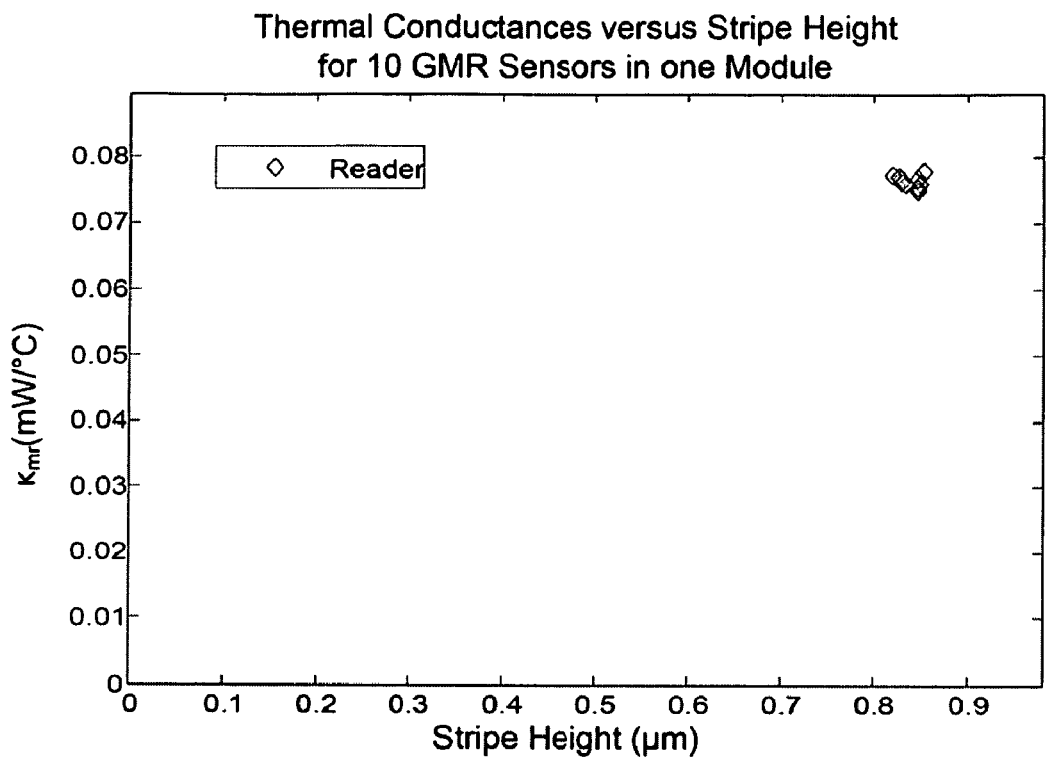
FIG. 9 is a plot of experimentally obtained data showing the thermal conductance, $\kappa_{mr}$, versus sensor stripe height (μm) for 10 sensors on one module.
Figure 10:
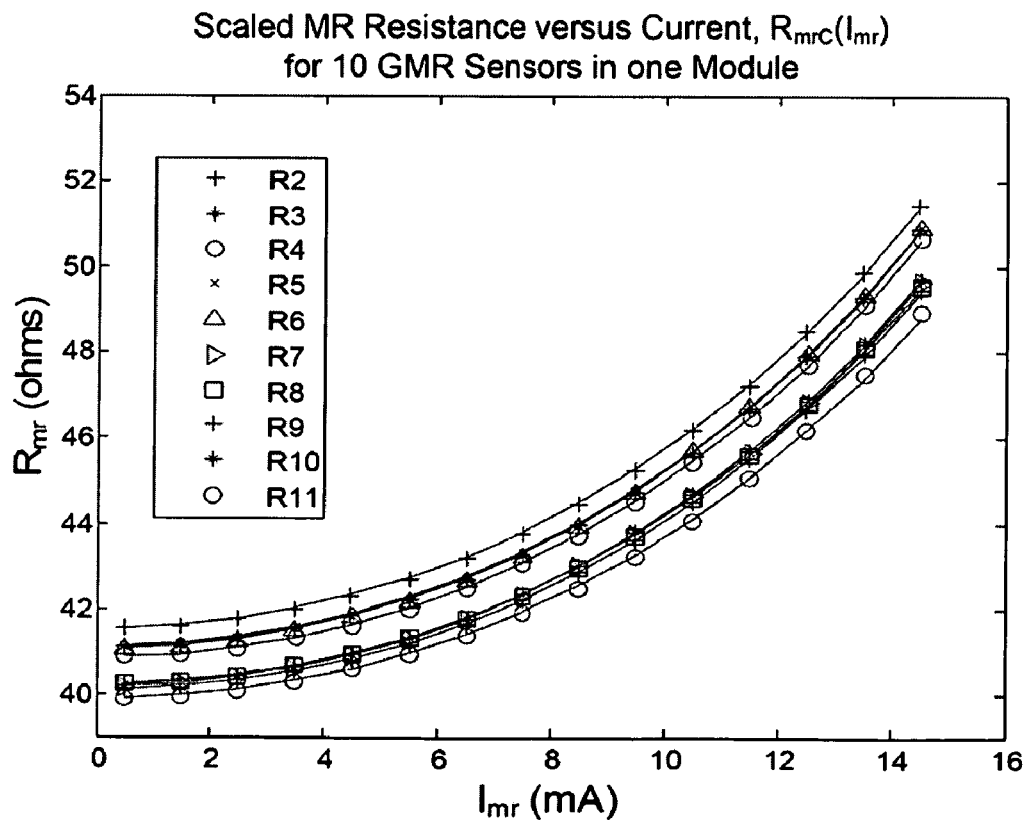
FIG. 10 is a plot of experimentally obtained raw data showing the scaled MR resistance ($R_{mrC}$) versus current ($I_{mr}$) for 10 sensors on one module.
Figure 11:
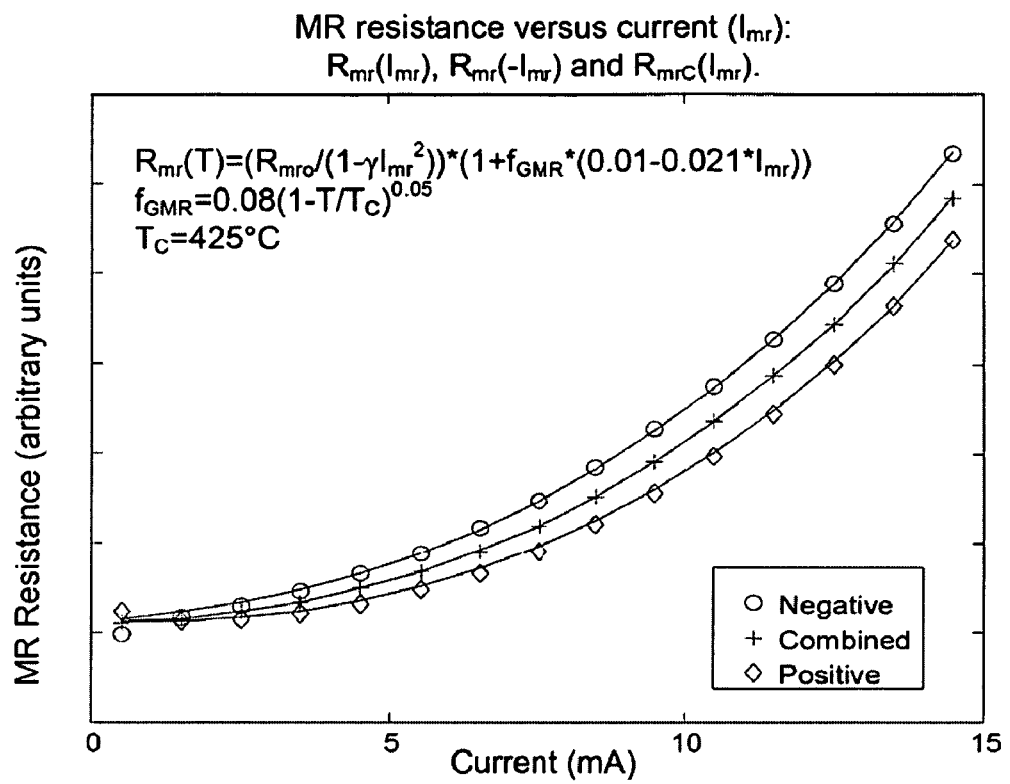
FIG. 11 is a plot of experimentally obtained raw data showing the MR resistance versus positive current $R_{mr}(I_{mr})$, negative current $R_{mr}(-I_{mr})$, and the combination of both currents, $R_{mrC}(I_{mr})$ for a single sensor.
Figure 12:
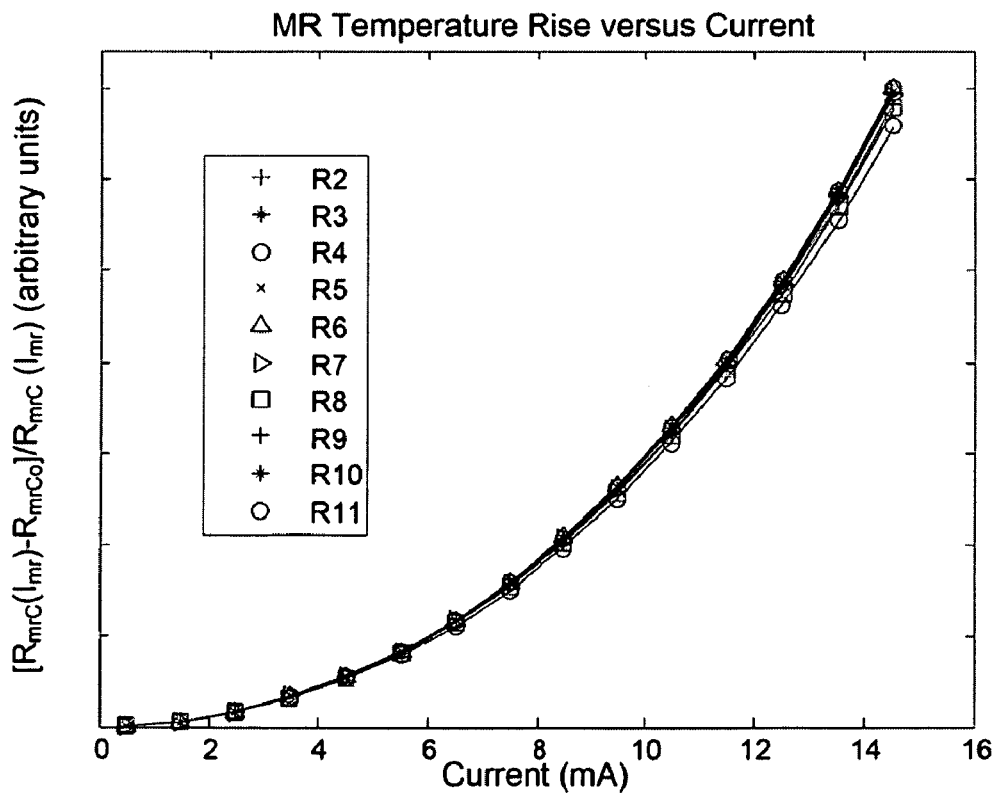
FIG. 12 is a plot of the GMR temperature rise versus the current applied to all sensors in one module.

FIG. 8 plots the scaled resistance for $R_{scaleC}(I_{mr})$ versus $I^2_{mr}$ and fits the data using Equation 8 to determine the parameter $\gamma_{mr}$, and thus the parameter $\kappa_{mr}$. $\kappa_{mr}$ is plotted versus the sensor stripe height (H) in FIG. 9. The raw data for the scaled resistance $R_{mrC}(I_{mr})$ is plotted in FIG. 10, along with the best fit using Equation 7 with the parameters derived from fitting the data in FIGS. 8 and 9. FIG. 11 is the raw data and fits to the MR Resistance versus positive current $R_{mr}(I_{mr})$, negative current $R_{mr}(-I_{mr})$, and the combination of both currents, $R_{mrC}(I_{mr})$ for a single sensor. The data is fit using Equations 5B, 5C and Equation 7 with values for $\delta_{gmr}$ from other experiments and a value of $\varepsilon$ chosen to fit the data. FIG. 12 plots the GMR Temperature rise versus the current applied to all sensors in one module.

Resistance Indication of Flip in Magnetizations of the SAFM

Figure 13A:
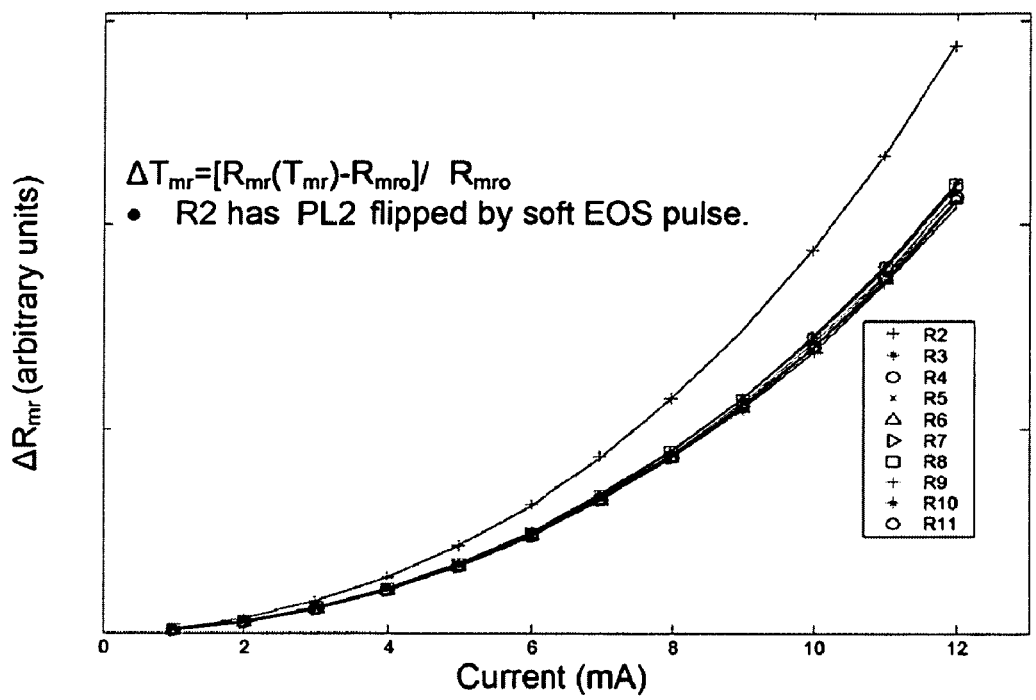
FIG. 13A is a plot of the fractional GMR resistance rise versus positive bias current for GMR stripes. All but one sensor is normal. Sensor R2 has a flipped pinned layer $PL_2$ by a soft reverse biased EOS pulse
Figure 13B:
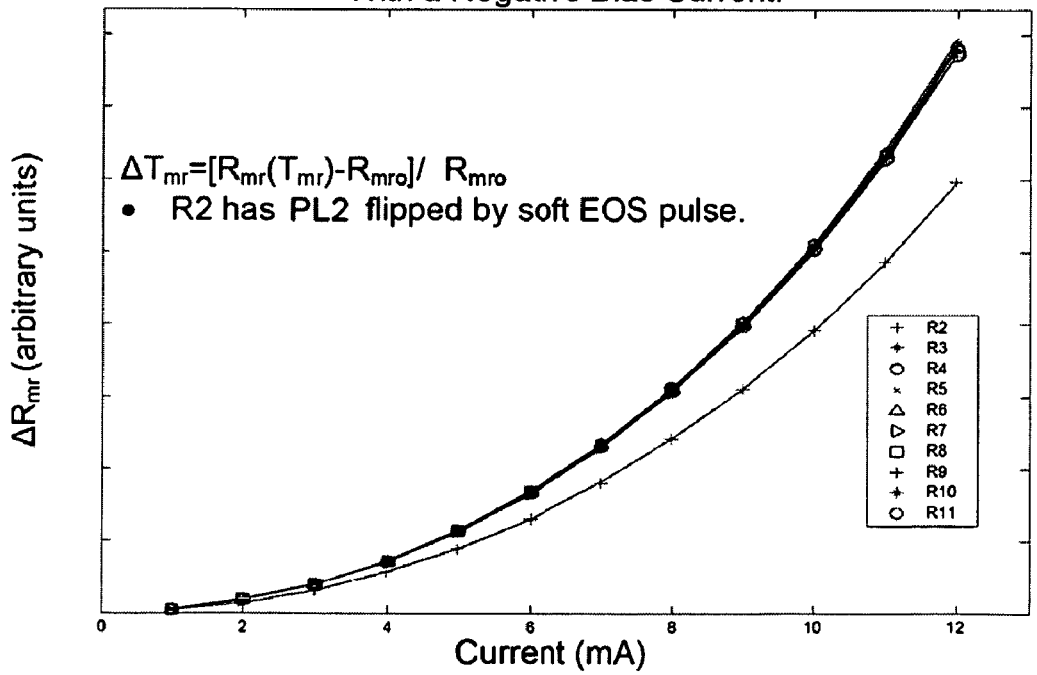
FIG. 13B is a plot of the fractional GMR resistance rise versus negative bias current for GMR stripes. All but one sensor is normal. Sensor R2 has a flipped pinned layer $PL_2$ by a soft reverse biased EOS pulse.

FIGS. 13A and 13B show change in resistance ($\Delta R_{mr}$) of GMR sensors versus positive and negative bias current, respectively. $\Delta R_{mr}$ is defined as the fractional change in resistance as given in Equation 13.

$$\Delta R_{mr} = [R_{mr}(I_{mr}) - R_{mr}(I_{mr}=0)]/R_{mr}(I_{mr}=0)$$ Equation 13

This method of detecting damaged sensors, according to one embodiment, uses the fractional change in resistance to determine sensors that have a reverse-aligned SAFM magnetization, and therefore are probably damaged. Sensors R3 through R11 are all good sensors with their pinned layers PL2 aligned properly. Sensor R2 has the magnetization of the pinned layer PL2 reverse aligned due to a soft EOS event (simulating a soft ESD event) which had a reverse bias current polarity. For forward polarity (FIG. 13A) at 12 mA, the value of $\Delta R_{mr}$ is about 30% higher than the undamaged sensors, while the resistance at 1 mA bias current is within 2% of the values of it's neighbors. In the reverse polarity (FIG. 13B) at -12 mA, the value of $\Delta R_{mr}$ for sensor R2 is about 25% lower than the undamaged neighboring sensors. The deviation in $\Delta R_{mr}$ for R2 versus the normal sensors indicates damage. The fact that for positive polarity $\Delta R_{mr}$ for R2 is larger than the others indicates a potential flip in the magnetization of pinned layer PL2, and thus most likely damage to the SAFM, but the cause of the damage is ambiguous. However, by analyzing the response of R2 for both positive and negative polarities, the ambiguity is alleviated. It is clear from the data that the only damage to the sensor is a reversal in the magnetization polarity of the pinned layer PL2, but that the magnitude of the difference in resistance from the positive and negative bias currents is the same for the damaged sensor as for the undamaged sensors.

Figure 14A:
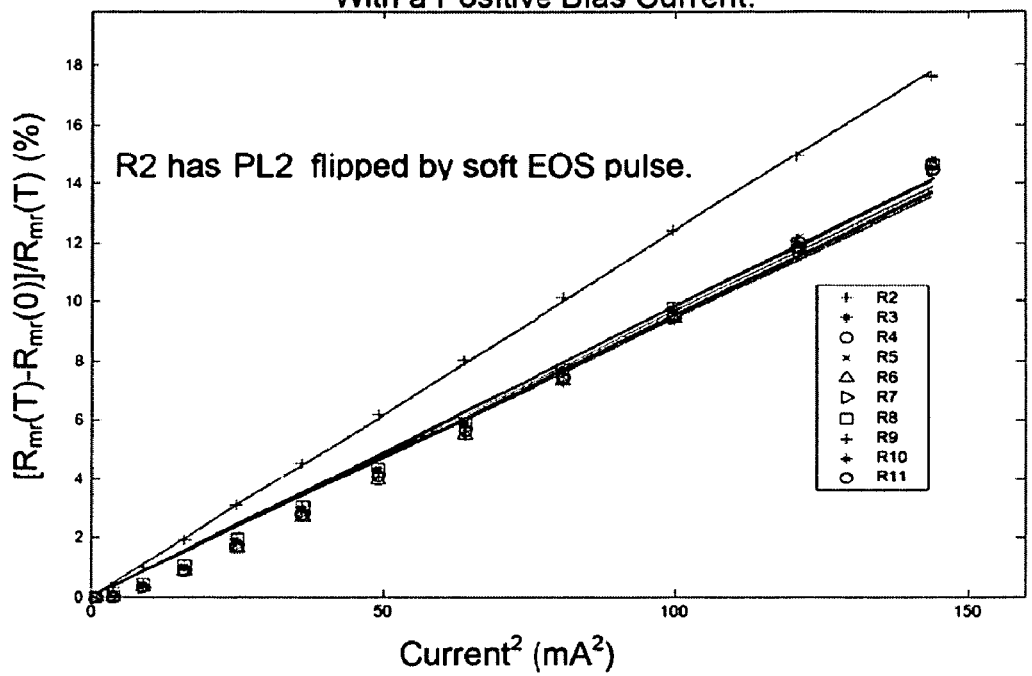
FIG. 14A is a plot of scaled resistance ($R_{scale}$) versus positive bias current squared for GMR stripes.
Figure 14B:
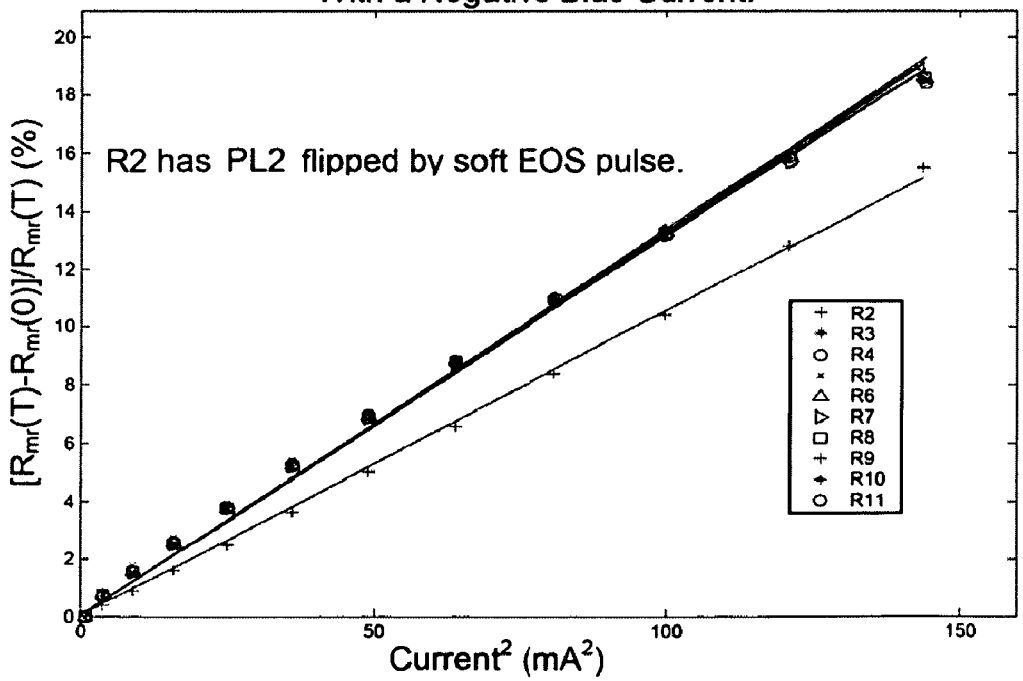
FIG. 14B is a plot of scaled resistance ($R_{scale}$) versus negative bias current squared for GMR stripes.

FIGS. 14A and 14B show another method of indicating if a magnetic sensor has been damaged, according to one embodiment. FIG. 14A shows a plot of scaled resistance ($R_{scale}$) versus bias current for GMR stripes when a positive bias current is applied. $R_{Scale}$ is a modification of $R_{ScaleC}$ (Equation 8). While $R_{ScaleC}$ uses the combined resistance, which removes the GMR effect, $R_{Scale}$ retain the asymmetry associated with the difference in sensor resistance versus polarity in the bias current. $R_{Scale}$ is defined as:

$$R_{Scale} = [R_{mr}(I_{mr}) - R_{mr}(I_{mr}=0)]/R_{mr}(I_{mr})$$ Equation 14

Sensors R4-R11 are all good sensors with their pinned layer PL2 properly aligned. Sensor R3 has the magnetization of pinned layer PL2 reverse aligned due to a soft ESD pulse which had a reverse bias current polarity, but then recovered by a forward bias pulse. Therefore, R3 has a scaled resistance versus bias current that is consistent with the other good sensors R4-R11. For forward polarity (FIG. 14A) at a bias current of 10 mA ($I_{mr}^2$ of 100 mA$^2$), the value of $R_{scale}$ for sensor R2 is about 12%, while the other sensors are all about 9%, or stated another way, sensor R2 has a value for $R_{scale}$ that is about 33% higher than the undamaged sensors. In the reverse polarity (FIG. 14B) at a bias current of 10 mA ($I_{mr}^2$ of 100 mA$^2$), the value of $R_{scale}$ for sensor R2 is about 10%, while the other sensors are all about 13% or stated another way, sensor R2 has a value for $R_{scale}$ that is about 30% lower than the undamaged sensors. The deviation in $R_{scale}$ for R2 versus the normal sensors indicates damage. The fact that for positive polarity $R_{scale}$ for R2 is larger than the others indicates a flip in the magnetization of the pinned layer PL2 (and thus damage to the SAFM), but the cause of the damage is ambiguous. However, by analyzing the response of R2 for both positive and negative polarities, the ambiguity is alleviated. It is clear from the data that the only damage to the sensor is a reversal in the magnetization polarity of the pinned layer PL2 (again, which is a result of damage to the SAFM layer).

In-Drive or Magtest Detection Method for SAFM Reversal

Another method for detecting the polarity of the magnetization of the pinned layer PL2 (and thus damage to the SAFM) according to one embodiment is to measure the polarity of the GMR voltage (or amplitude) response to a known written track. One of two parameters should be known before detecting the polarity of the magnetization of the pinned layer PL2, either (1) the polarity of the written magnetization on the magnetic storage media (here called tape) or (2) a comparison of the response of a group of sensors and compared to their polarity.

In normal drive operation using partial response maximum likelihood (PRML) or peak detect methods, the polarity of the transition is not used, only the transitions. In order to determine whether the magnetization of the SAFM for a GMR sensor has had the magnetization orientation reversed, a method of determining the polarity of the transitions should be determined.

Figure 15A:
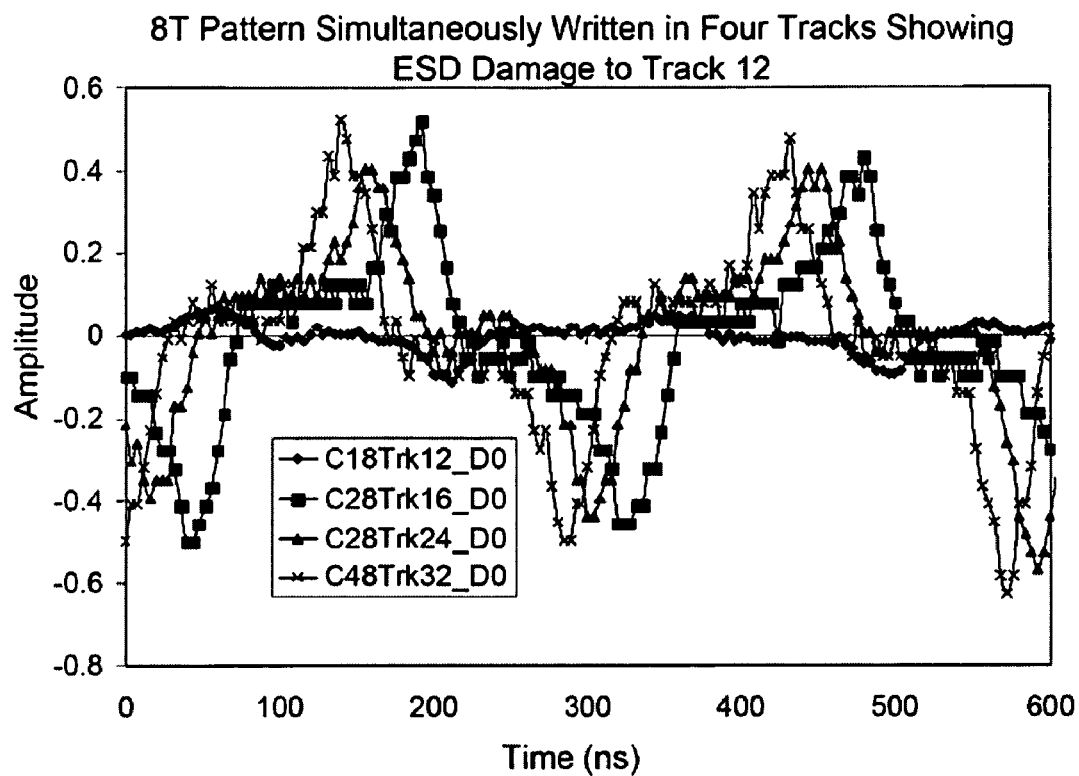
FIG. 15A is a plot of the time dependence of an 8T pattern that was written for four tracks.
Figure 15B:
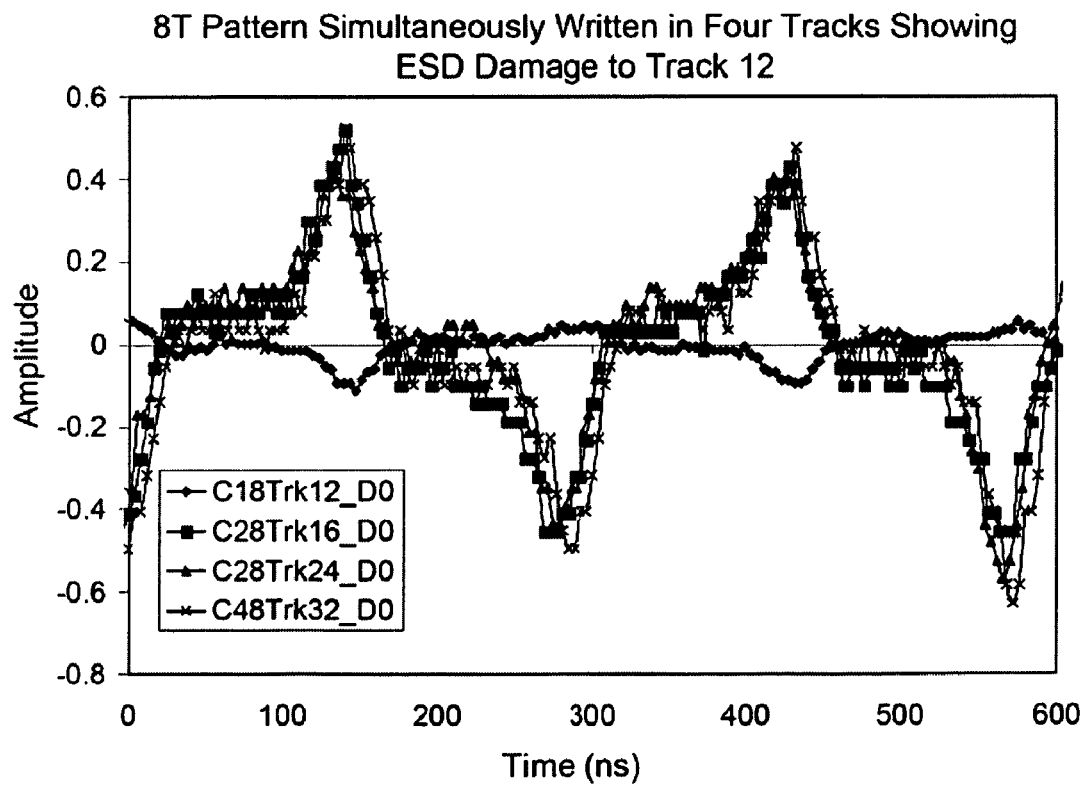
FIG. 15B is a plot of the time dependence of an 8T pattern that was written for four tracks with a −3.25 ns/track time shift.

FIGS. 15A and 15B show the time dependence of an 8T pattern that was written onto a tape simultaneously and with the same writer polarity for all four tracks. The tape was rewound and the read-back signal was detected. FIG. 15A shows the raw data with the tracks skewed with respect to the tape direction by −3.25 ns/track. The defective track was excluded from the determination of the shift. FIG. 15B shows the timing of the pulses shifted by −3.25 ns/track to account for the tilt of the head so the timing of all four tracks is aligned. The aligned tracks in FIG. 15B show that track 12 is 180° out of phase with respect to tracks 16, 24 and 32. Track 12 has had an ESD event which flipped the AFM. The amplitude of track 12 is also lower than the others. Thus, track 12 is ESD damaged and has both a degraded amplitude and a reversed pinned layer magnetic field.

In the analysis described above, the defective track is excluded from the determination of the shift. In an automated setting, one of several methods may be chosen to determine the exclusion. One method could be to exclude a track which is defective or poorly performing based on other parameters. Possible parameters may be: (1) poor error rate performance; (2) low amplitude; (3) abnormal asymmetry (Vp−Vn)/(Vp+Vn), where Vp and Vn are the absolute values of the peak positive and negative voltages.

Figure 16:
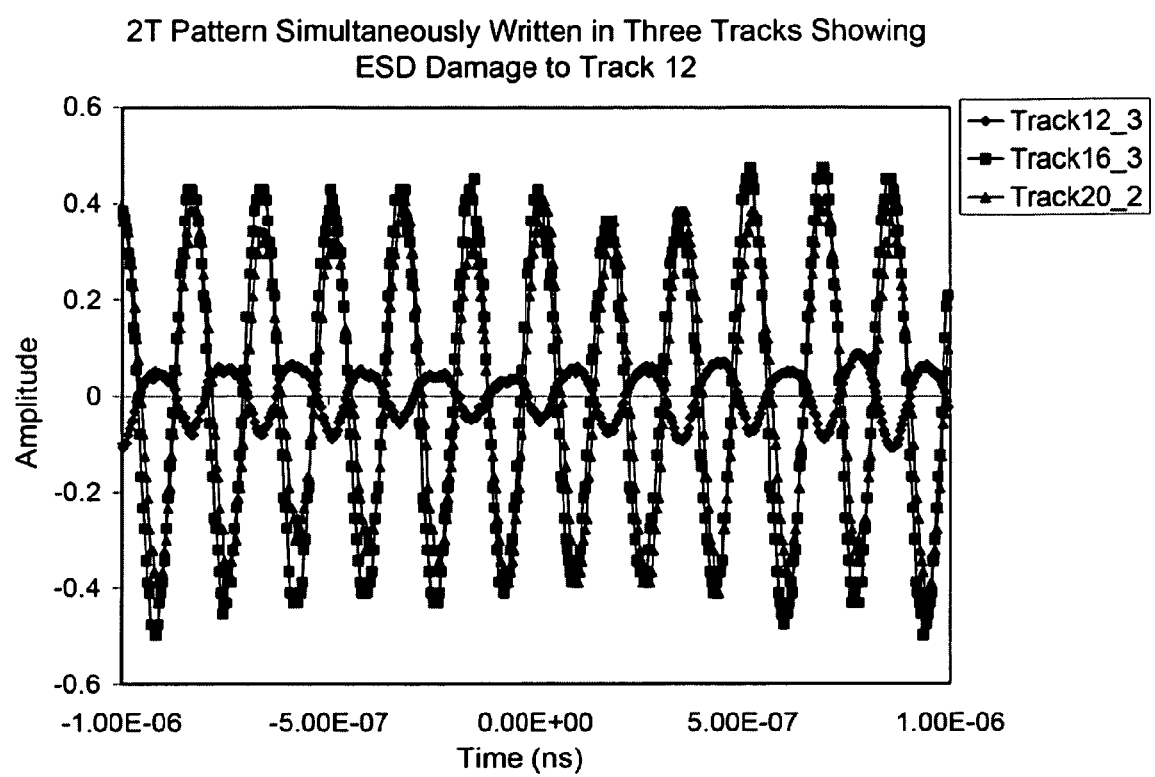
FIG. 16 is a plot of the time dependence of a 2T pattern that was written for three tracks.

FIG. 16 shows the time dependence of a 2T pattern which was written onto a tape simultaneously and with the same writer polarity for all three tracks. The tape was rewound and the read-back signal was detected. Tracks 16 and 20 were normal tracks. Track 12 had an ESD event which resulted in the pinned layer being flipped. The magnetic amplitude of Track 12 was also damaged. The flip of the pinned layer magnetization is verified by the reversal in the polarity of the read-back signal. The amplitude degradation is obvious from the decreased amplitude of the signals.

One method of determining the polarity of the transitions in the drive would be to apply a specific pre-determined written pattern. An example would be to write alternating 8T and 2T patterns. The transitions may be such that the first long magnetized segment (8T) yields a positive transition, while the first short magnetized segment (2T) yields a negative transition. The tracks can also be written just prior to testing the parts. As stated earlier, with multiple sensors, the polarity of the signal of the sensor in question can also be compared to the neighbors for higher precision. In the case of multiple sensors, the polarity of the signal is easier to determine by using the signals from the neighbors. In the case of multiple sensors, the transitions for all tracks are all written simultaneously and in phase. They are also read simultaneously. Post analysis of the data can be used to determine the phase shift along the tracks due to difference in the skew of the head during writing and reading.

Figure 17:
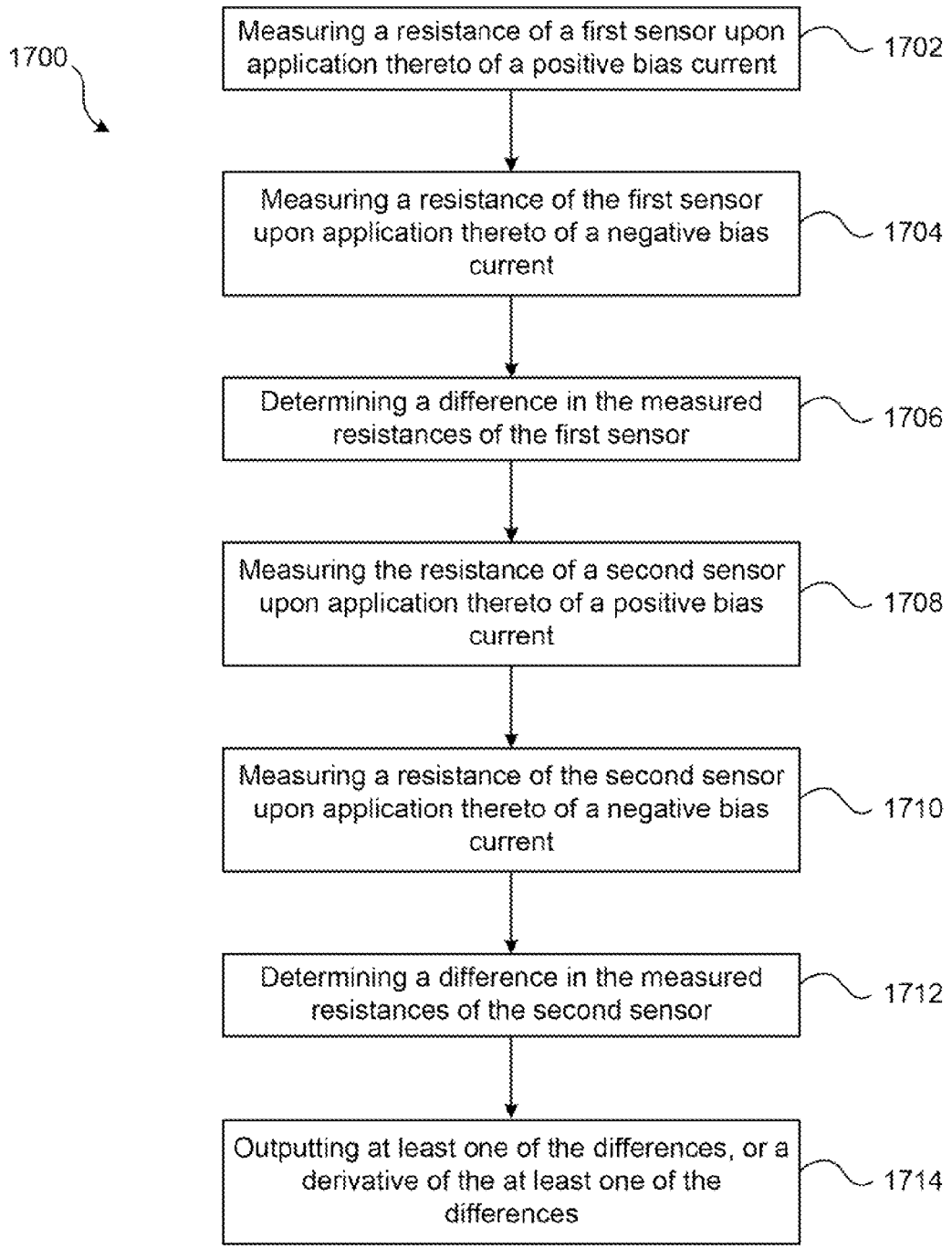
FIG. 17 is a flow chart of a method for detecting damage to sensors according to one embodiment.

Now referring to FIG. 17, a method 1700 for detecting a damaged sensor according to one embodiment is shown. As an option, the present method 1700 may be implemented in the context of the functionality and architecture of FIGS. 1-5. Of course, the method 1700 may be carried out in any desired environment. It should be noted that the aforementioned definitions may apply during the present description.

With continued reference to FIG. 17, in operation 1702, a resistance of a first sensor is measured upon application thereto of a positive bias current. It should be noted that a bias current is simply a current passed through the sensor, and no special characteristics or requirements should be attributed to the bias currents described herein unless otherwise noted. This current may be applied with any method commonly known in the art. For explanatory purposes, the first sensor is deemed to be a faulty or damaged sensor which is not responding or functioning similarly to the other sensors in an array.

In operation 1704, a resistance of the first sensor is measured upon application thereto of a negative bias current, i.e., passed through the sensor in the reverse direction as the positive bias current. Operations 1702 and 1704 are freely alternated, as it does not matter whether the positive or negative bias current is applied first.

In operation 1706, a difference (DiffPN) in the measured resistances at positive and negative bias currents of the first sensor is determined. DiffPN is essentially given by $R_{mrD}$ as defined by Equation 10. DiffPN can also be given in a scaled form, $R_{scaleD}$, of Equation 11. For a narrow current range where the sensors undergo minimal Joule heating (several 10s of degrees Centigrade) $R_{scaleD}$ is essentially independent of current. The sign of DiffPN can be positive or negative, depending on the definition of positive or negative current, but for a given sensor design, the polarity of $R_{mrD}$ and $R_{scaleD}$ will be the same for all sensors, and for all good sensors with the same geometry the values for and $R_{scaleD}$ and for $R_{mrD}$ (both fall under the category of DiffPN for future reference) will fall within a determined standard deviation of a nominal value based on the design. Any parts which fall outside of the nominal values are deemed damaged.

In operation 1708, the resistance of a second sensor is measured upon application thereto of a positive bias current. Once again, this current may be applied with any method commonly known in the art. For explanatory purposes, this second sensor is a properly functioning, undamaged sensor in an array of sensors having a faulty sensor. Additionally, the resistance of more than one second sensor in an array may be measured, and the average of all sensors measured may be determined, and substituted as the second sensor resistance.

In operation 1710, a resistance of the second sensor is measured upon application thereto of a negative bias current. Operations 1708 and 1710 are freely alternated, as it does not matter whether the positive or negative bias current is applied first.

In operation 1712, a measured DiffPN resistance of the second sensor is determined. This difference can be positive or negative, but it is only the absolute value difference that is sought. For explanatory purposes, this second difference is deemed to be the difference for a properly functioning, undamaged sensor in an array of sensors, or it may be the average difference determined for an array of sensors. This difference may include or exclude the resistance difference determined for a faulty or damaged sensor that is in the array.

In operation 1714, at least one of the DiffPN resistances, or a derivative of the at least one of the differences is outputted. A derivative of the at least one of the DiffPN resistances can be anything derived from the differences, such as graphical representations, charts or tables or mathematical expressions representative of the DiffPN resistances, a sum of the DiffPN resistances, a difference between the first and second DiffPN resistance, a ratio of the DiffPN resistance, values, deviations, a diagnosis of one or more of the sensors, etc.

This outputted difference from operation 1714 may be used to determine which, if any, of the sensors in the array is faulty or damaged, and additionally, the difference may indicate which type of damage has occurred. In one particularly preferred embodiment, the first sensor is diagnosed as being damaged, i.e., having electrostatic discharge (ESD) damage, if the measured DiffPN resistances of the first sensor is less than the measured DiffPN resistances of the second sensor.

In another embodiment, the first sensor is diagnosed as having ESD damage if the first sensor has a similar resistance value at a given positive or negative bias current level as the second sensor has at the same positive or negative bias current level while the DiffPN resistance is different. For example, similar resistance values may be determined where the resistance values are within design tolerances for the magnetic head or sensor array; alternatively, within less than about 20 ohms of each other; alternatively, about 10 ohms; alternatively, about 5 ohms; alternatively, about 1 ohm.

In another embodiment, the first sensor is diagnosed as being damaged if the sign of the measured DiffPN resistance of the first sensor is opposite in sign to the measured DiffPN of the second sensor. This inverse relationship may be caused by a flipping of the magnetic orientation of the pinning layer PL2, which could be related to damage to the (S)AFM layer(s). Such magnetic orientation flipping may, for example, be a result of ESD damage.

In one particularly preferred embodiment, the first sensor is diagnosed as having ESD damage if the first sensor has a similar measured resistance at a forward bias current of |Ibias| as the other, undamaged sensor has at a negative bias current, −|Ibias|, and the first sensor has a similar measured resistance at a reverse bias current of −|Ibias| as the other, undamaged sensor has at a forward bias current, |Ibias|. The above mentioned "inverse" response of the DiffPN resistance is indicative of a flipped magnetic orientation of the pinning layer PL2. The magnitude of the DiffPN resistance is related to the GMR response of the sensor and to the strength of the magnetic field created in the free layer by the bias current.

In another particularly preferred embodiment, damage via corrosion can be diagnosed using the DiffPN value and the absolute resistance value of the sensors. The first sensor is diagnosed as having being damaged by corrosion when the first sensor has a higher resistance value at a given positive or negative bias current level than the second sensor has at the same positive or negative bias current level, while the DiffPN resistance of the first sensor is similar in magnitude with the DiffPN resistance of the second sensor (e.g., within design tolerances for the magnetic head or sensor array; alternatively, within less than about 20 ohms of each other; alternatively, about 10 ohms; alternatively, about 5 ohms). For example, this type of damage may be caused by corrosion.

In yet another embodiment, the resistances of the sensors that are measured in operations 1702-1712 are measured at several different positive bias current levels and several different negative bias current levels. At least one of the differences can then be outputted according to operation 1714, or weight-averaged to determine a single weighted-average difference to be outputted according to operation 1714. An example of a weighted average ($FR_{weight}$) would be the DiffPN resistance ($\Delta R_{PN}$(Ibias)) divided by the absolute value of the bias current (|Ibias|) measured at positive ($R(+|Ibias|)$) and negative ($R(-|Ibias|)$) values of Ibias:

$$FR_{weight}=[R(+|Ibias|)-R(+|Ibias|)]/[[R(+|Ibias|)+R(+|Ibias|)]*|Ibias|]$$

In a further embodiment of method 1700, the resistances of the sensors that are measured in operations 1702-1712 are measured at several different positive bias current levels and several different negative bias current levels. The differences in the measured resistances of the first sensor at each of the levels of the positive and negative bias currents are determined. Also, differences in the measured resistances of the second sensor at each of the levels of the positive and negative bias currents are determined. At least one of the differences or a derivative of the at least one of the differences is then outputted according to operation 1714.

Figure 18:
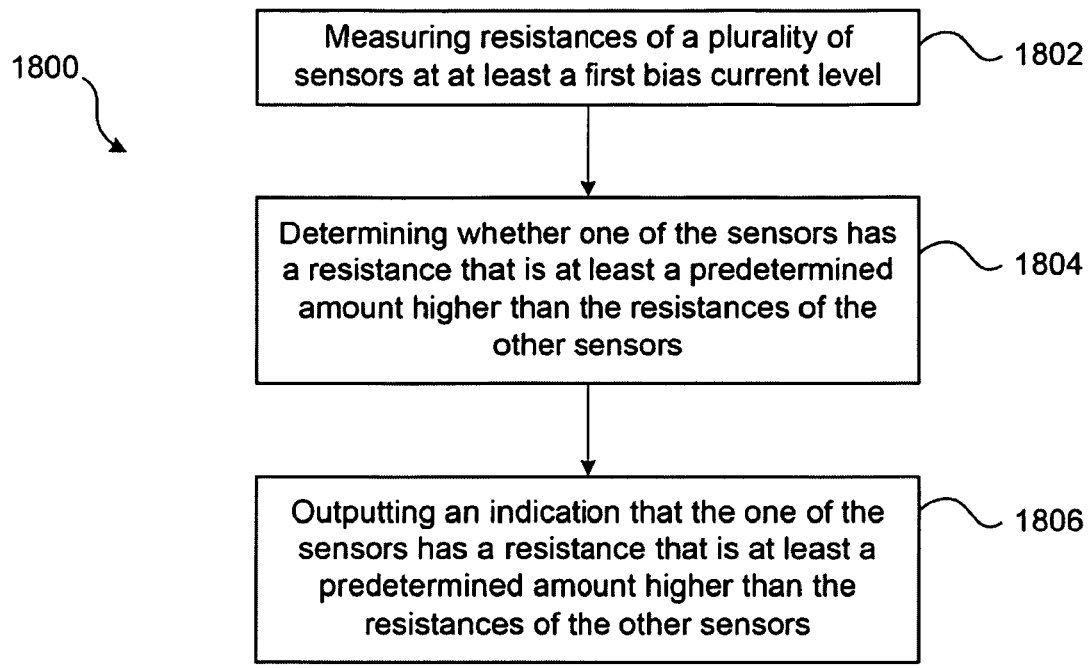
FIG. 18 is a flow chart of a method for detecting damage to sensors according to one embodiment.

Now referring to FIG. 18, a method 1800 for detecting a damaged sensor according to one embodiment is shown. As an option, the present method 1800 may be implemented in the context of the functionality and architecture of FIGS. 1-5. Of course, the method 1800 may be carried out in any desired environment. It should be noted that the aforementioned definitions may apply during the present description.

In operation 1802, at least a first bias current level is applied to a plurality of sensors, the resistances of which are measured. It should be noted that a bias current is simply a current passed through the sensor, and no special characteristics or requirements should be attributed to the bias currents described herein unless otherwise noted.

In operation 1804, whether one of the sensors has resistance that is at least a predetermined amount higher than the resistances of the other sensors is determined.

In operation 1806, an indication that the one of the sensors having a resistance that is at least a predetermined amount higher than the resistances of the other sensors is outputted.

In another embodiment of method 1800, in operation 1802 a positive and negative bias current are applied to the one of the sensors. The negative bias current is passed through the sensor in the reverse direction as the positive bias current. The resistance of the one of the sensors is measured at several different positive bias current levels and several different negative bias current levels during application of the positive and negative bias currents. The measured DiffPN resistances of the one of the sensors at each of the levels of the positive and negative bias currents are determined.

In yet another embodiment, the indication that is outputted in operation 1806 includes graphical display data corresponding to a chart plotting the resistances versus bias current levels. This chart can be used to determine if one of the sensors has damage due to such events as electrical overstress (EOS), ESD, corrosion, etc.

In a further embodiment, the resistances which are measured at several different positive and negative bias currents are scaled resistances. In addition, the indication that is outputted in operation 1806 includes graphical display data corresponding to a chart plotting the scaled resistances versus bias current levels. This chart can be used to determine if one of the sensors has damage due to such events as electrical overstress (EOS), ESD, corrosion, etc.

Figure 19:
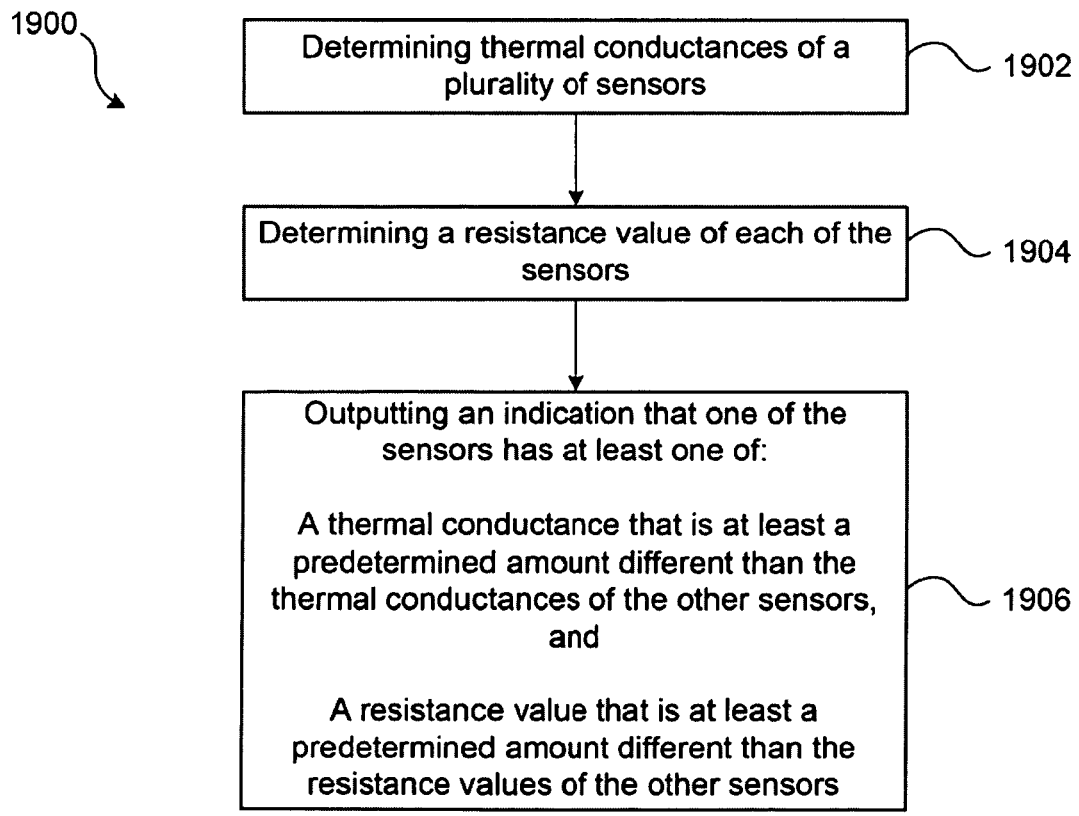
FIG. 19 is a flow chart of a method for detecting damage to sensors according to one embodiment.

Now referring to FIG. 19, a method 1900 for detecting a damaged sensor according to one embodiment is shown. As an option, the present method 1900 may be implemented in the context of the functionality and architecture of FIGS. 1-5. Of course, the method 1900 may be carried out in any desired environment. It should be noted that the aforementioned definitions may apply during the present description.

In operation 1902, thermal conductances of a plurality of sensors are determined.

In operation 1904, a resistance value of each of the sensors is determined.

In operation 1906, an indication is outputted that one of the sensors has at least one of: (1) a thermal conductance that is at least a predetermined amount different than the thermal conductances of the other sensors; and (2) a resistance value that is at least a predetermined amount different than the resistance values of the other sensors.

In another embodiment of method 1900, in operation 1906, graphical display data corresponding to a chart plotting the thermal conductances versus approximate stripe heights of the sensors is output.

In a further embodiment, the resistance values are representative of approximate stripe heights of the sensors.

In further experiments on GMR sensors, other methods to determine the potential failure cause were used. Some of the GMR sensors have high resistance values, which could be indicative of either corrosion or ESD events. As discussed earlier, the magnitude of the difference in resistances between and reverse bias currents indicates the magnitude of the GMR effect, as indicated by Equations 10 and 11. An ESD event can result in a decrease in $R_{mrD}$ or $R_{ScaleD}$ due to a decrease in it's GMR response ($\delta_{gmr}$) with only a minor change in the sensor resistance. Thus, large increases in resistance (5% or 10% or more) with only a minor decrease in $R_{mrD}$ or $R_{ScaleD}$ (less than 30% decrease) are more likely another source of degradation, such as corrosion of the sensor for distances of tens to hundreds of nm from the TBS (depending on the sensor stripe height). Corrosion should show up in an AFM scan, and on a scanning electron microscope (SEM), and possibly as an increase in the Wallace spacing losses as measured from a magnetic media with a high density of magnetic transitions, such as used in modem magnetic tape or disk drives.

Figure 20A:
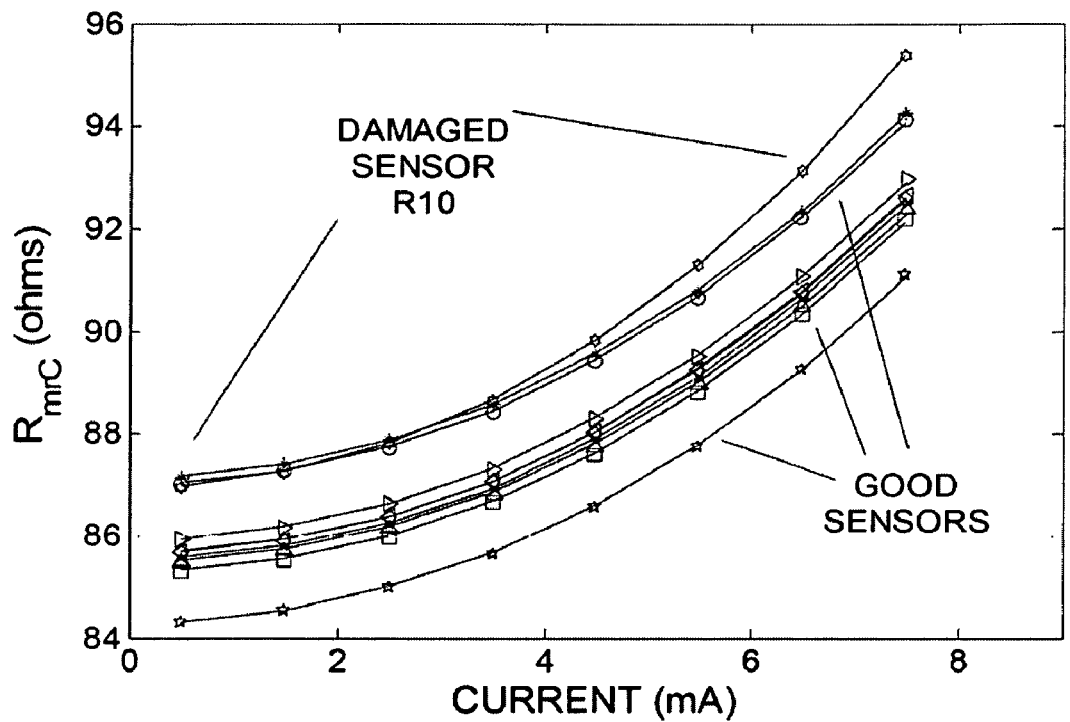
FIG. 20A is a plot of MR resistance ($R_{mr}$) versus positive and negative bias current for an undamaged sensor.

Now referring to FIG. 20A, the resistance of all of the sensors in the tape head are plotted versus the bias current. Sensor R10 is the damaged sensor. In this simple plot of resistance versus bias current, it is extremely difficult to determine that sensor R10 is damaged. However, as we shall show, there are several means of analyzing the data which accentuate the damaged sensor and make it's damage more pronounced and easier to detect.

Figure 20B:
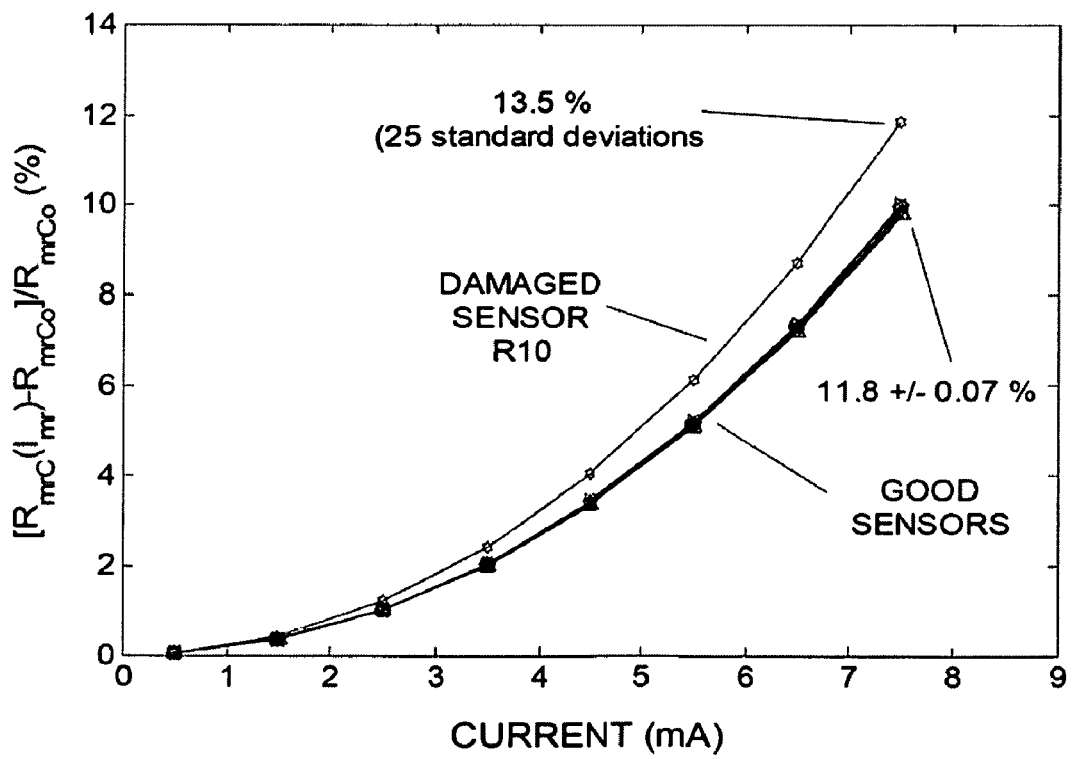
FIG. 20B is a plot of MR resistance ($R_{mr}$) versus positive and negative bias current for a damaged sensor.

Here we describe a resistance scaling form which accentuates damage to a sensor. In FIG. 20B, the percentage change in resistance combined resistance, $R_{mrC}$, is plotted versus the bias current for all the sensors in the tape head. The damaged sensor R10 exhibits an increase in $R_{mrC}$ of 13.5% at 7.5 mA compared to 0.5 mA, which is 13.5 standard deviations greater than the value of 11.8±0.07% for the good sensors. Thus, using the percentage increase in $R_{mrC}$ is clearly a better means of detecting damage than is the pure resistance value of $R_{mrC}$.

Figure 20C:
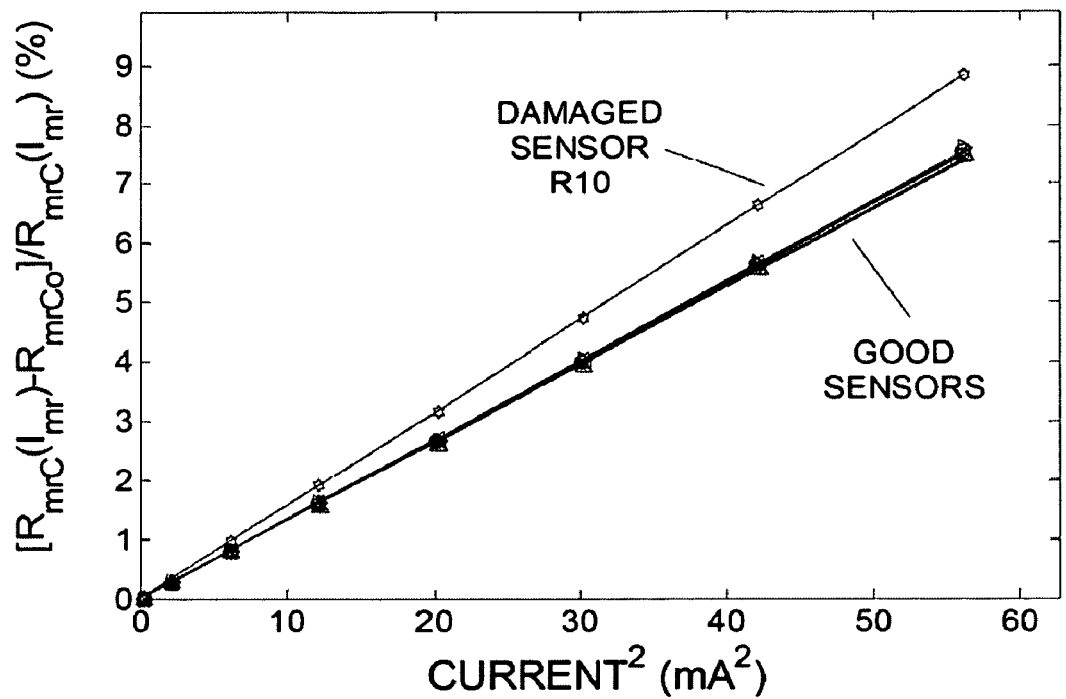
FIG. 20C is a plot of the MR resistance ($R_{mrhb}$) versus a combined positive and negative bias current for all sensors in a drive.

Another means of accentuating damage is to use the scaling function $R_{scaleC}$ defined in Equation 8 can be used to accentuate damage to a sensor. Referring to FIG. 20C, the scaled resistances $R_{scaleC}$ are plotted versus the bias current squared ($I^2_{mr}$). This plot indicates that at an $I_{mr}$ of 7.5 mA, ($I^2_{mr}$ of 55 mA$^2$), the scaled resistance of sensor R10 is about 8.8%. The undamaged sensors all have a scaled resistance of about 7.5% at 7.5 mA. Stated another way, sensor R10 has a scaled resistance about 17% higher than the other undamaged sensors, indicating damage to sensor R10.

Figure 20D:
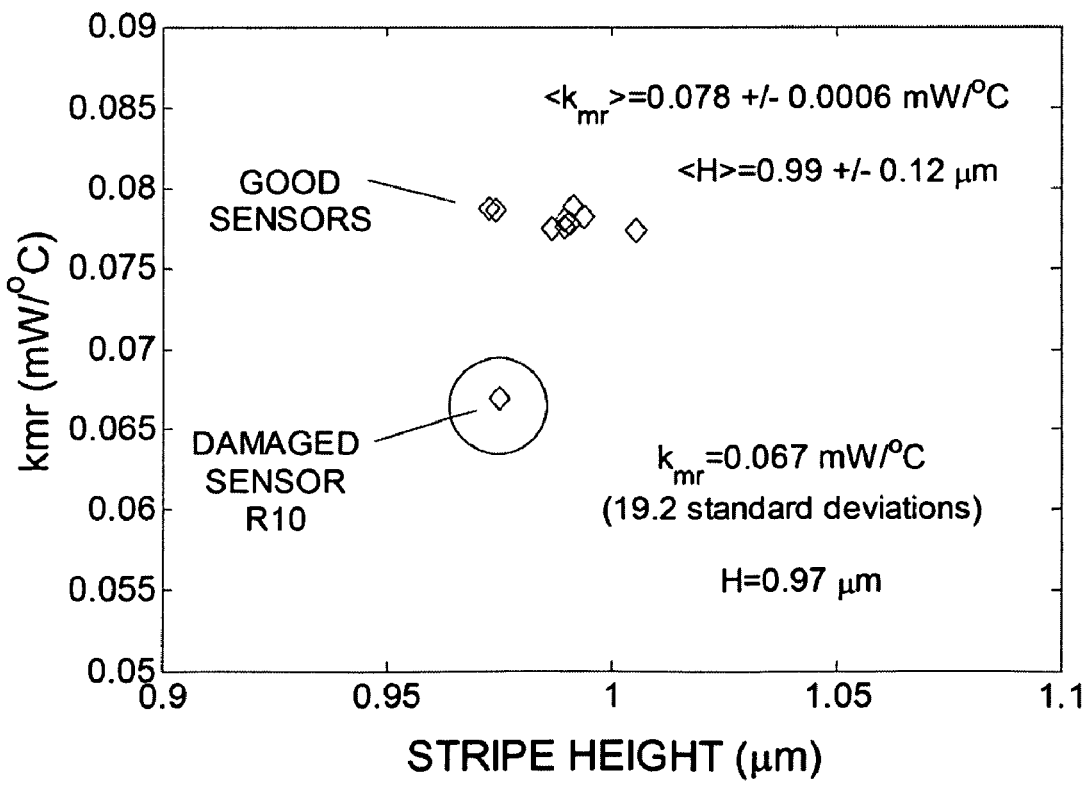
FIG. 20D is a plot of the temperature rise versus bias current for all sensors in a drive.

Another means of determining damage is to use the thermal conductance parameter, as given in Equations 4 and 5C, and extracted experimentally using Equation 8. In FIG. 20D, thermal conductance ($\kappa_{mr}$) is plotted versus the calculated stripe height (H), in µm. After removing the servo reader data from consideration, the undamaged sensors are all closely grouped together with a thermal resistance of about 0.078±0.0006 mW/° C. However, sensor R10 has a thermal conductance of 0.067 mW/° C., which is 19.2 standard deviations lower than the average for the group of good sensors. The average stripe height for the good sensors is 0.99+/−0.12 µm, with a minimum of 0.97 µm and a maximum of 1.01 µm. Sensor R10 has a stripe height of 0.97 µm, which is within 1.5 standard deviations of the average of the good parts, and within the range of the measured values. While, sensor R10 has a thermal conductance that 19.2 standard deviations lower than the undamaged sensors, the calculated stripe height is within the range of the other undamaged sensors. This indicates that sensor R10 is not damaged by corrosion.

Figure 20E:
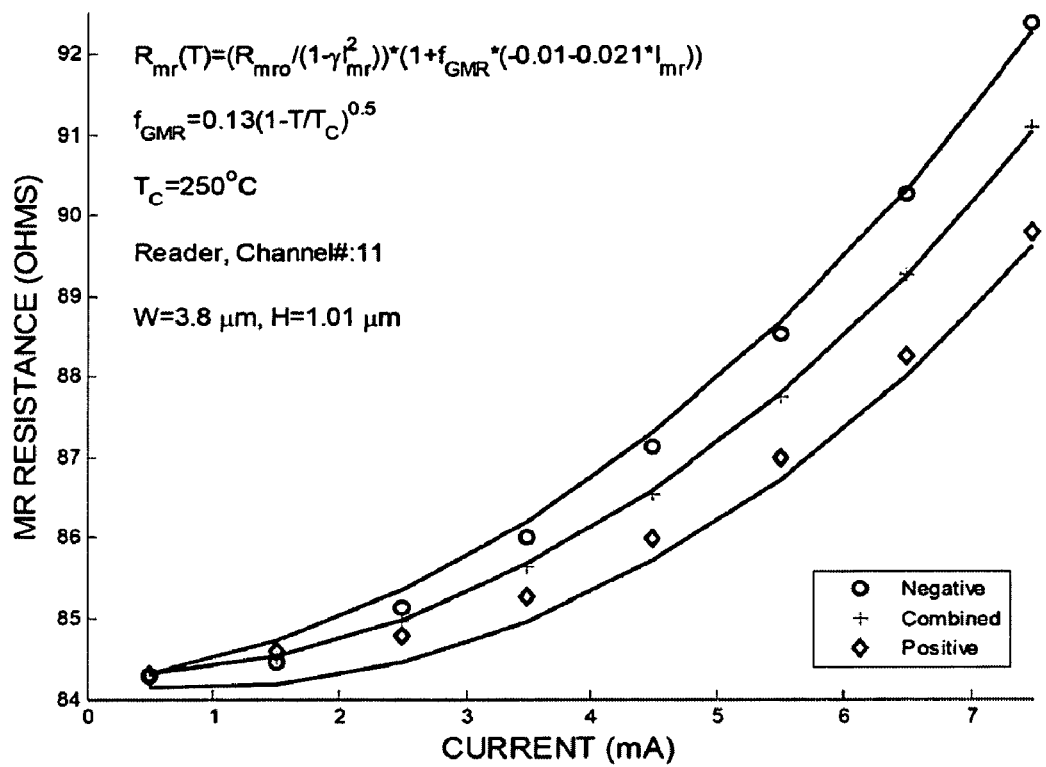
FIG. 20E is a plot of the scaled resistance ($R_{scale}$) versus bias current squared for all sensors in a drive.
Figure 20F:
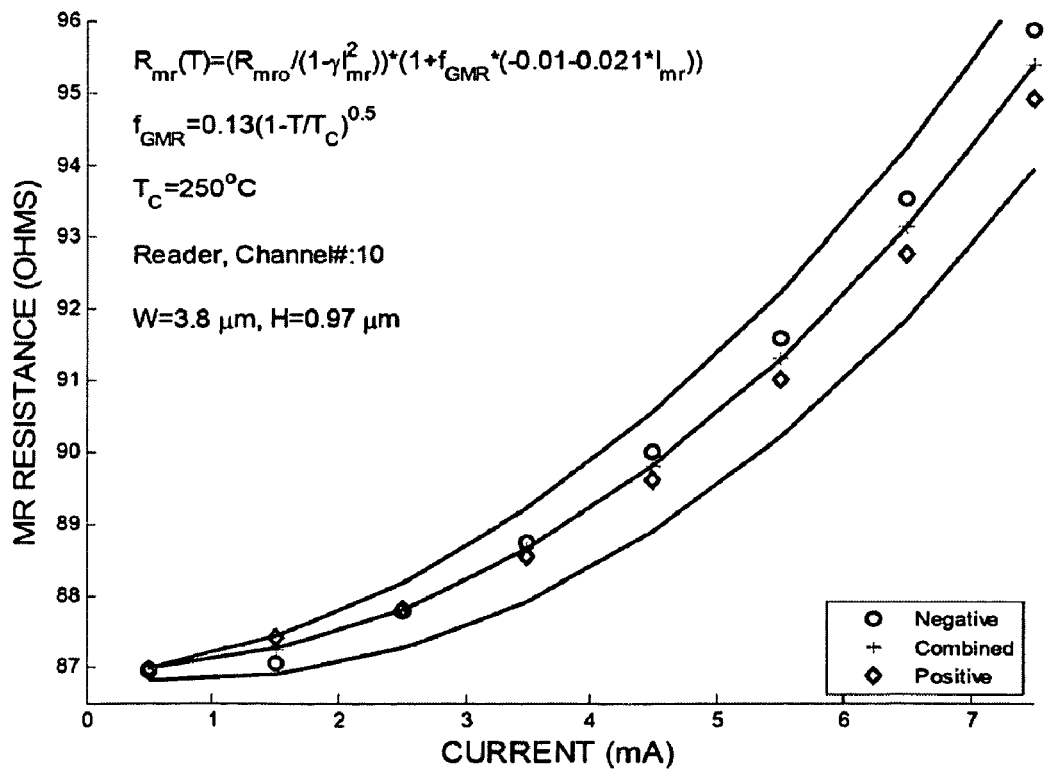
FIG. 20F is a plot of the thermal conductance ($\kappa_{mr}$) versus calculated stripe height for all sensors in a drive.

Now a means of determining damage to the GMR response of the sensor is to use the difference in the resistance measured at positive and negative bias currents. Now referring to FIG. 20E, a good sensor (R11) is shown in a plot of MR resistance versus current. In FIG. 20F, a damaged sensor (R10) is shown in a plot of MR resistance versus current, with a good sensor's positive and negative bias current trend lines shown. Also shown in the figure is $R_{mrC}$, and projected fits to $R_{mr}(+I_{mr})$ and $R_{mr}(-I_{mr})$ using Equation 5B. Sensor R10 exhibits a decreased GMR response with a normal resistance at $R_{mr}(+I_{mr})$ or $R_{mr}(-I_{mr})$. For example, at 6.5 mA, $R_{mrD}$ is about 0.8Ω for the damaged sensor R10, which is ~30% of the value of the good sensor R11. At the same time, at 0.5 mA, the difference in resistance between R10 and R11 is only about 3%, and as discussed earlier, the stripe height of sensor R10 is within the range measured for the good sensors. Thus, combining all the above described methods of analyzing damage to the sensor R10, an ESD pulse is the most likely the cause of this damage.

Figure 21A:
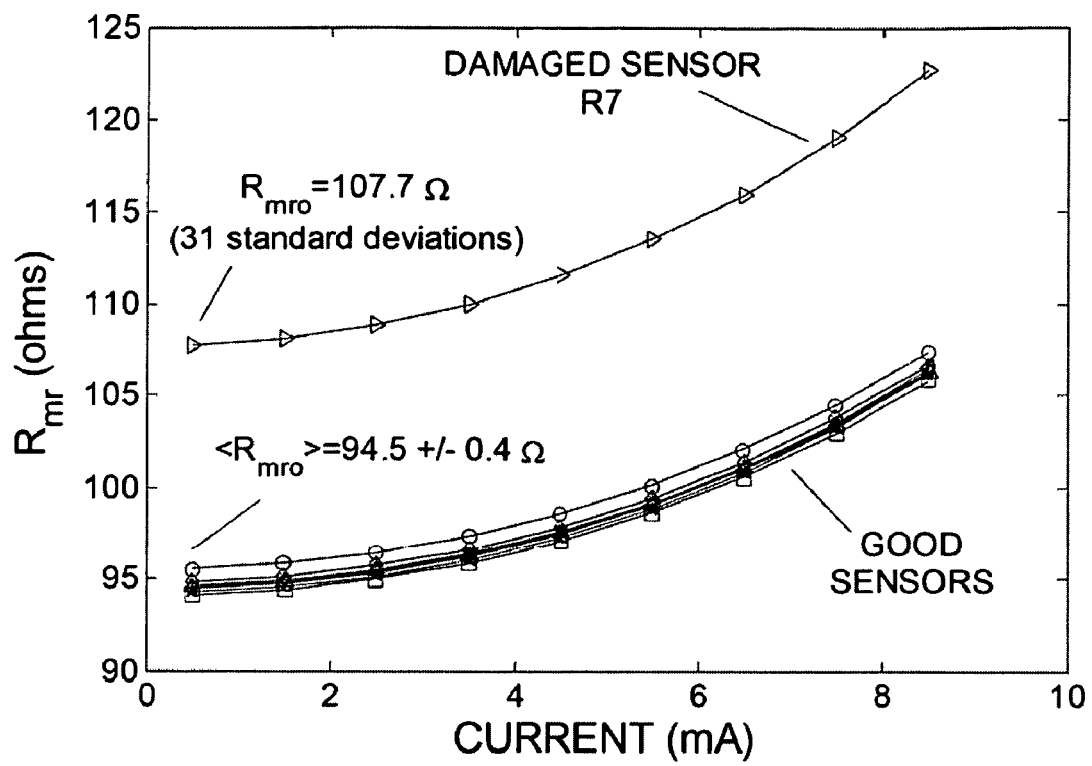
FIG. 21A is a plot of MR resistance ($R_{mr}$) versus positive and negative bias current for an undamaged sensor.

Next, we will discuss a situation where a sensor is damaged such that it has a large increase in it's low current resistance while maintaining a healthy GMR response. Such damage is most likely corrosion. Now referring to FIG. 21A, the resistance of all of the sensors in the tape head are plotted versus the bias current. At 0.5 mA, the resistance of the good sensors is 94.5±0.4Ω, while sensor R7 has a resistance of 107.7Ω, which is 14% or 31 standard deviations greater than the average of the good sensors. This large increase in resistance of Sensor R7 is maintained for all bias currents measured. Sensor R7 is clearly.

Figure 21B:
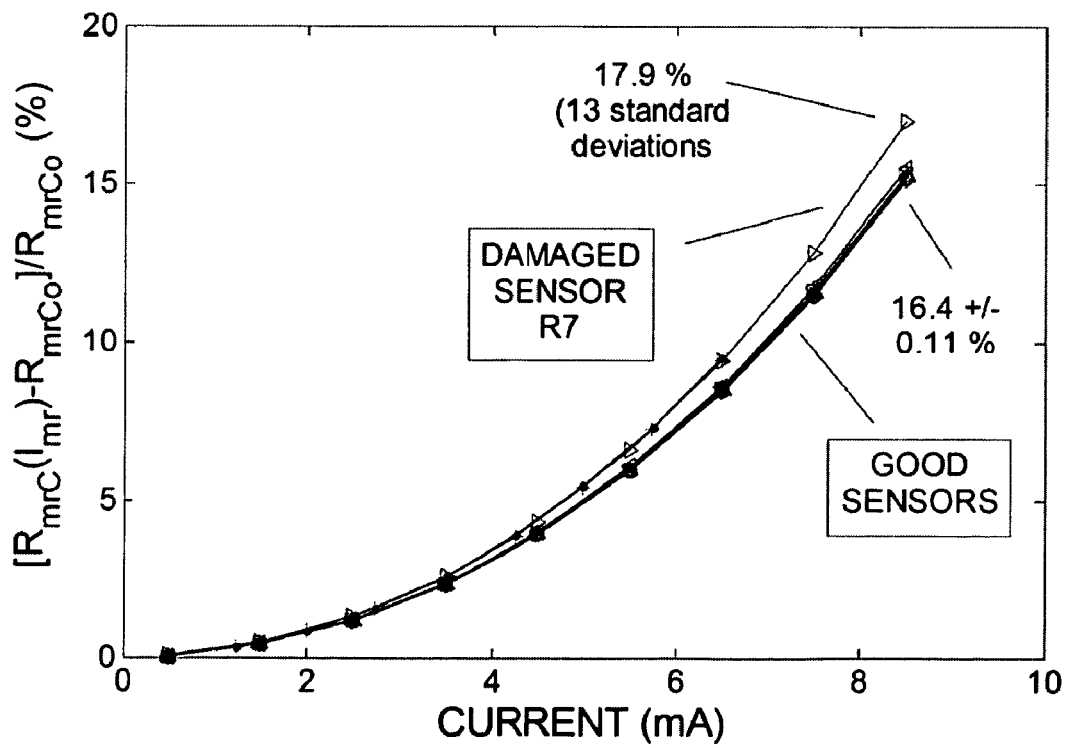
FIG. 21B is a plot of MR resistance ($R_{mr}$) versus positive and negative bias current for a damaged sensor.

Another method of showing the damage to the sensor is to look at the change in the combined resistance $R_{mrC}$ versus bias current, as is shown in. FIG. 21B for all the sensors in the tape head. At 8.5 mA, the average increase in $R_{mrC}$ is 16.4±0.11% for the good sensors and is 17.9% for the sensor R7. The percentage increase in $R_{mrC}$ is 9.1% higher, or 13 standard deviations higher than the other undamaged sensors, also indicating damage of some kind.

Figure 21C:
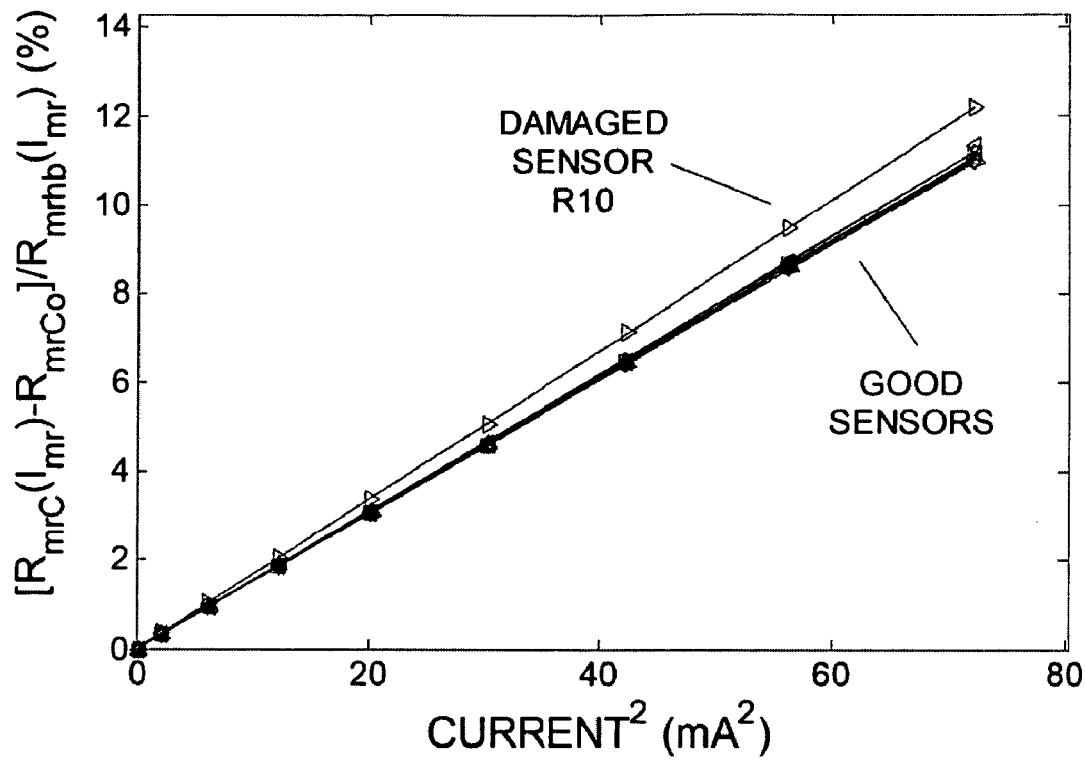
FIG. 21C is a plot of the GMR stripe-hard-bias resistance ($R_{mrhb}$) versus a combined positive and negative bias current for all sensors in a drive.

Now referring to FIG. 21C, the scaled resistances ($R_{scale}$) are plotted versus the bias current squared ($I^2_{mr}$). This plot indicates that the scaled resistance of sensor R7 is about 12% at 8.5 mA (72 mA$^2$). The undamaged sensors all have a scaled resistance of about 11% at 8.5 mA. Stated another way, sensor R7 has a scaled resistance about 9% higher than the other undamaged sensors, indicating damage to sensor R7.

Figure 21D:
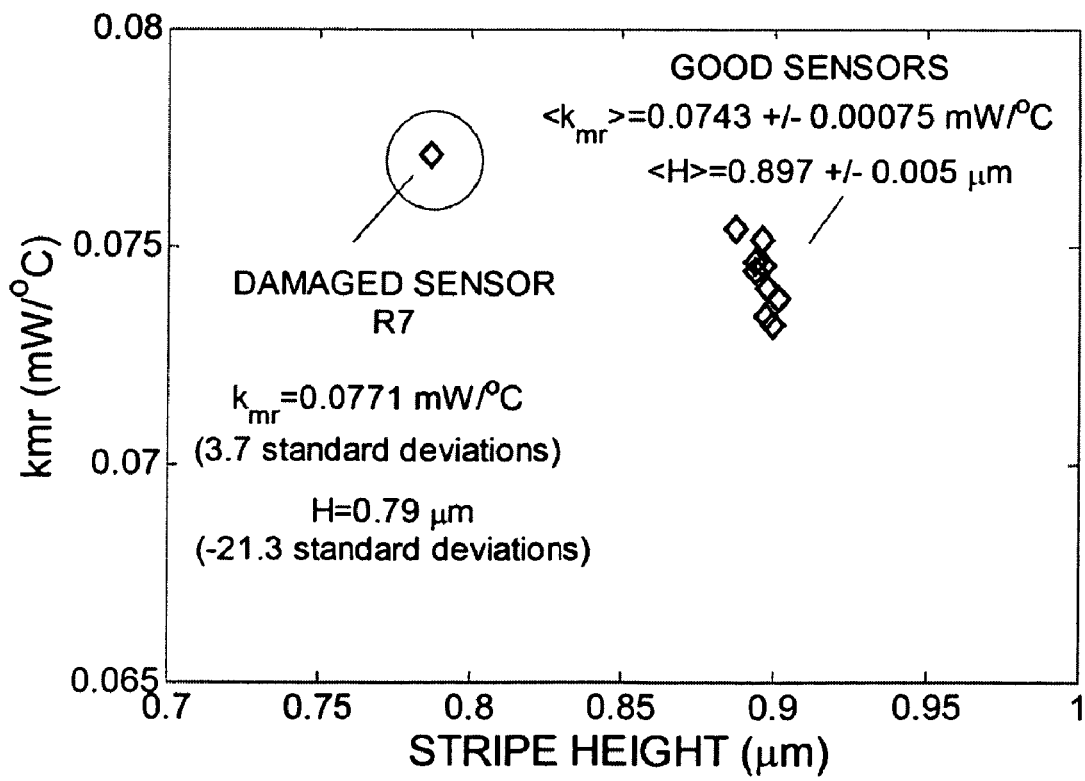
FIG. 21D is a plot of the temperature rise versus bias current for all sensors in a drive.

Another method of highlighting the damage to the sensor is to use the thermal conductance ($\kappa_{mr}$) versus stripe height (H), as shown in FIG. 21D. The undamaged sensors are all closely grouped together with a thermal conductance of 0.0743±0.00075 mW/° C. Sensor R7 has a thermal conductance of 0.0771 mW/° C., which is 3.7 standard deviations greater than the average for the good sensors, indicating potential damage. The average stripe height for the good sensors is 0.0879±0.005 µm. The stripe height of sensor R7 is 0.79 µm, which is 21.3 standard deviations lower than that of the group of good sensors. Thus the stripe height and thermal conductance of sensor R7 both point to some form of damage.

While sensor R7 is clearly different from the other sensors in the same head when compared against them, using either straight resistance or the thermal conductance versus stripe height method, damage to even an individual sensor is difficult to ascertain by simply using the measured value. Ascertaining damage to an individual sensor using the straight resistance method alone is impossible, since in both hard disk (HDD) and tape drive technologies, the range of resistances allowed within a product is often 50% or more of the median values. Damage to an individual sensor, as in a HDD, though can be ascertained by comparing the thermal conductance versus calculated stripe height against the statistically expected value for a group of many good sensors. FIG. 7 shows a method of determining the expected parameters for $\kappa_{mr}$ versus H, and Equation 9 shows the functional form for $\kappa_{mr}$(H) which can be used.

Figure 21E:
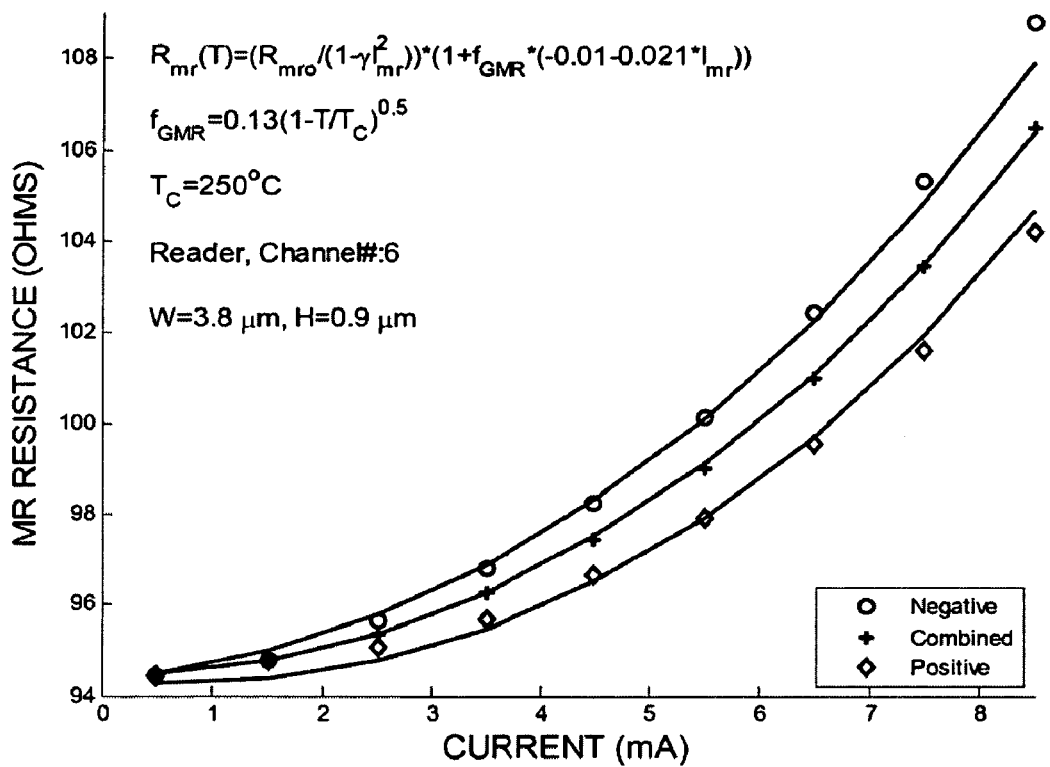
FIG. 21E is a plot of the scaled resistance ($R_{scale}$) versus bias current squared for all sensors in a drive.
Figure 21F:
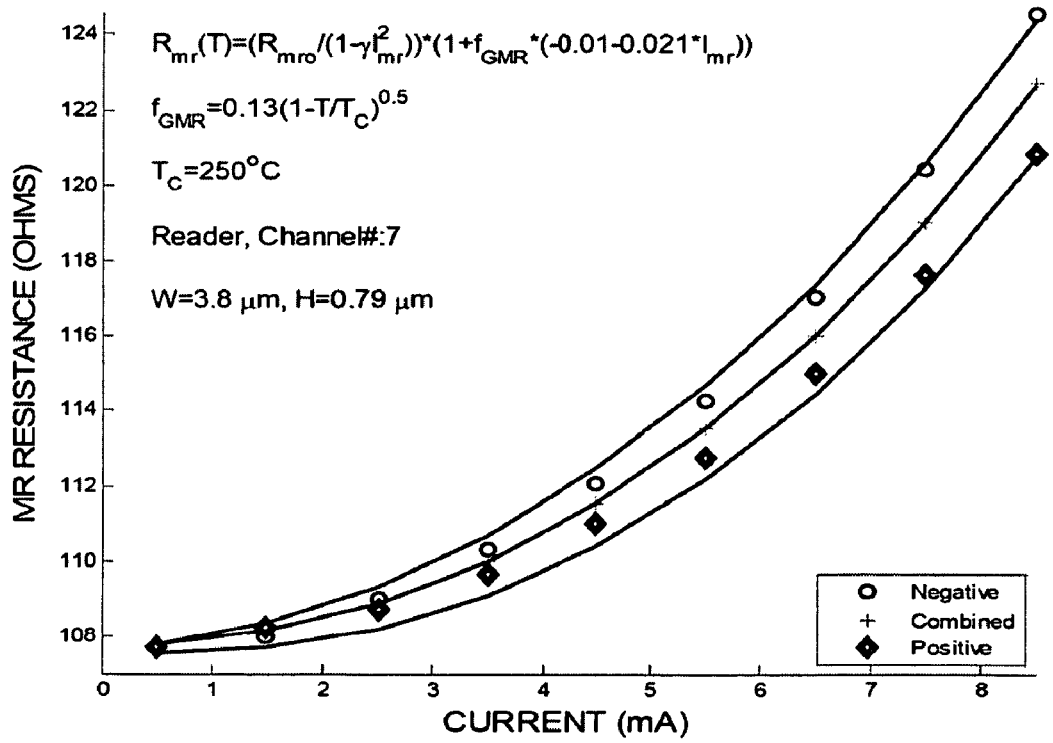
FIG. 21F is a plot of the thermal conductance ($\kappa_{mr}$) versus calculated stripe height for all sensors in a drive.

Further indication that the damage to the sensor is due to corrosion in a layer of about 130 nm from the TBS is due to the fact that the sensor still exhibits a substantial amount of GMR response. Referring to FIG. 21E, a good sensor (R06) is shown in a plot of MR resistance versus positive and negative bias current. The data is also fit with a projected curve given by Equation 5B. In FIG. 21F, a damaged sensor (R7) is shown in a plot of MR resistance versus positive and negative currents. Also shown are the projected values for resistance using Equation 5B. Sensor R7 exhibits only a slightly decreased GMR response ($\delta_{gmr}$) as given by Equations 10 and 11. Corrosion is a likely cause of this damage.

Since the resistance of R7 is so much greater than it's neighbors (14 ohm), but the GMR response is only slightly decreased (as shown on FIG. 21F), sensor R7 was probably not subject to ESD damage, but is probably damaged due to corrosion. A 14 ohm increase in resistance due to ESD damage would have caused a substantial decrease in GMR response, and that is not indicated for this sensor.

In another embodiment, a method for detecting a damaged magnetoresistive sensor includes analyzing readback signals of a plurality of sensors each being positioned over data tracks on a passing magnetic medium; determining whether at least one of the readback signals is out of phase with respect to the other readback signals, and/or whether at least one of the readback signals has a significantly lower amplitude that the other readback signals.

In one approach, if the at least one of the readback signals has a significantly lower amplitude when compared to the other readback signals, further comprising diagnosing the sensor associated with the at least one of the readback signals as having been damaged.

In another approach, if the at least one of the readback signals is out of phase with the other readback signals, further comprising diagnosing the sensor associated with the at least one of the readback signals as having a layer with a flipped magnetization.

In a further approach, the relative phase of the read back signals for a multiplicity of read sensors is determined by first determining peak amplitude time for each reader, then assuming that the time for the peak amplitude for reader n+1 has a time shift dt from the peak amplitude time for reader n, then doing a best fit to a linear equation for the peak amplitude time of the nth reader time for the peak amplitude for each sensor given by to+(n−1)*dt; where to is the best fit choice for the peak amplitude time for reader n=1; wherein the timing for all sensors is shifted to a corrected time tc where tc=tm−to−(n−1)*dt; wherein any sensor who's peak amplitude is 180 degrees out of phase with the group of sensors is deemed to have been damaged via an electrostatic discharge or electrical overstress event. As an option, at least one track is not included in determining the best fit to the time for the peak amplitude versus track number, but the timing of all tracks is adjusted using the resulting best fit to the linear shift; wherein the timing for all sensors is shifted to the corrected time; wherein any sensor having a peak amplitude that is 180 degrees out of phase with the group of sensors is deemed to have been damaged via an electrostatic discharge or electrical overstress event.

In another embodiment, a method for detecting a damaged magnetoresistive sensor includes measuring a median DiffPN value of a group of GMR sensors on a module, the sensors characterized as having been deposited on a same wafer and having been lapped as a single unit; comparing the DiffPN values to the median; determining that at least one of physical and magnetic damage has occurred to an individual sensor if the difference in the DiffPN value of the individual sensor from the median is greater than a statistically predetermined value for the group of sensors; where the difference is at least one times the average of the standard deviations of a large number of normal modules or the average of the standard deviations of a large number of modules, wherein at least the largest and the smallest DiffPN value within the module is not included in the calculation of the module's standard deviation.

In one approach, DiffPN is given by the difference in the resistance Rp which is measured at a positive current Ibias minus the resistance Rn which is measured at a current of substantially the same magnitude as the positive current but with the opposite sign, which is −Ibias; so DiffPN=Rp−Rn.

In another approach, DiffPN is given by the difference in the resistance Rp minus Rn divided by the average of Rp and Rn; so DiffPN=2*(Rp−Rn)/(Rp+Rn).

In another approach, DiffPN is given by the difference in the resistance Rp minus Rn divided by the average of Rp and Rn, and divided again by the bias current Ibias; so DiffPN=2*(Rp−Rn)/(Ibias*(Rp+Rn)).

In another approach, if the difference is at least a given number S2 (e.g., 1, 2, 3, 4, 5, 6, 7, 8, etc.) times the average standard deviation for a large number of normal modules then the part is considered defective and is rejected. The damage may be at least one of electrostatic discharge, electrical overstress, and magnetic instability. For example, 5 standard deviations may be used, e.g., S2=5.

In another approach, if the difference is at least a given number S1 (e.g., 1, 2, 3, 4, 5, 6, 7, 8, etc.) but less than a number S2 (e.g., 1, 2, 3, 4, 5, 6, 7, 8, etc.) times the average standard deviation for a large number of normal modules then the part is tested by another method to verify whether it is actually damaged. The other testing method may, for example, be a magnetic testing of high density magnetic transitions written onto a magnetic media such as a magnetic tape or a hard disk used for data storage; wherein measurements such as signal amplitude, signal-to-noise ratio, signal asymmetry of a positive and a negative going transition and relative phase of adjacent sensors.

In another embodiment, a method for detecting a damaged magnetoresistive sensor includes measuring DiffPN values of all GMR sensors on a module where a module contains a multiplicity of GMR sensors deposited on the same wafer and which have been lapped as a single unit; fitting the DiffPN values versus sensor position within the array of sensors to a polynomial, wherein at least one of either the largest DiffPN values or at least one of the smallest DiffPN is not included in the fitting; determining a difference in the DiffPN value for each individual sensor to the polynomial fit; calculating a standard deviation of the group of DiffPN values from the polynomial fit values; performing a second polynomial fit with all DiffPN values that are within a predetermined value of the first polynomial fit; using the second polynomial fit for determining the deviation of each individual DiffPN value from the second polynomial fit; and wherein any sensor which is 1, 2, 3 or more standard deviations from the projected value is determined to be damaged.

In one approach, the polynomial is of order 0, 1 or 2. In another approach, the predetermined value is 1, 2 or 3 times the standard deviation.

In another approach, if the difference is at least a given number S1 but less than a number S2 times the average standard deviation for a large number of normal modules then the part is tested by another method to verify whether it is actually damaged. For example, the other testing method may be a magnetic testing of high density magnetic transitions written onto a magnetic media such as a magnetic tape or a hard disk used for data storage; wherein measurements such as signal amplitude, signal-to-noise ratio, signal asymmetry of a positive and a negative going transition and relative phase of adjacent sensors.

In another approach, if the difference is at least a given number S2 times the average standard deviation for a large number of normal modules then the part is considered defective and is rejected. The damage may be at least one of electrostatic discharge, electrical overstress, and magnetic instability.

It will also be clear to one skilled in the art that the method of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting a damaged magnetoresistive sensor, comprising:
measuring a resistance of a first sensor upon application thereto of a positive bias current;
measuring the resistance of the first sensor upon application thereto of a negative bias current;
determining a difference in the measured resistances at positive and negative currents of the first sensor;
measuring a resistance of a second sensor upon application thereto of a positive bias current;
measuring the resistance of the second sensor upon application thereto of a negative bias current;
determining a difference in the measured resistances at positive and negative currents of the second sensor;
outputting at least one of the differences, or a derivative of the at least one of the differences;
diagnosing the first sensor as being damaged if a magnitude of the difference in the measured resistances at positive and negative currents of the first sensor is less than a magnitude of the difference in the measured resistances at positive and negative currents of the second sensor; and determining at least one of a fractional change in resistance and a scaled resistance for each sensor at each of the current levels, wherein the first and second sensors are independent sensors in an array of sensors formed on a common substrate.

2. The method as recited in claim 1, wherein the resistances of the sensors are measured at several different positive bias currents levels and several different negative bias current levels, wherein only sensors are present on the common substrate.

3. The method as recited in claim 1, wherein the resistances of the sensors are measured at several different positive and/or negative bias currents levels, wherein the fractional change in resistance is determined for each sensor at each of the current levels using the following equation:

$$\Delta R_{mr} = [R_{mr}(I_{mr}) - R_{mr}(I_{mr}=0)]/R_{mr}(I_{mr}=0),$$

where $\Delta R_{mr}$ is defined as the fractional change in resistance at a particular $I_{mr}$;

$I_{mr}$ is the bias current level applied to the respective sensor;

$R_{mr}$ is defined as the measured resistance at the $I_{mr}$.

4. The method as recited in claim 1, further comprising diagnosing the first sensor as being damaged if, though the differences in the measured resistances at positive and negative currents for each sensor are similar, the first sensor has a statistically significant higher or lower resistance value at a given bias current level than the second sensor has at the same bias current level.

5. The method as recited in claim 4, wherein only sensors are present on the common substrate.

6. The method as recited in claim 1, further comprising diagnosing the first sensor as having corrosion damage if the difference in the measured resistances at positive and negative currents of the first sensor is substantially the same as the difference in the measured resistances at positive and negative currents of the second sensor and a sum of the measured resistances at positive and negative currents of the first sensor is statistically different than a sum of the measured resistances at positive and negative currents of the second sensor.

7. The method as recited in claim 1, further comprising comparing at least one of the measured resistances of the first sensor to at least one of the measured resistances of the second sensor for diagnosing the first sensor as being damaged.

8. The method as recited in claim 1, wherein the resistances of the sensors are measured at several different positive and/or negative bias currents levels, wherein the scaled resistance is determined at each of the bias current levels using the following equation:

$$\Delta R_{Scale} = [R_{mr}(I_{mr}) - R_{mr}(I_{mr}=0)]/R_{mr}(I_{mr}),$$

where $\Delta R_{Scale}$ is defined as a scaled resistance at a particular $I_{mr}$;

$I_{mr}$ is the bias current level applied to the respective sensor;

$R_{mr}$ is defined as the measured resistance at the $I_{mr}$.

9. A system for detecting a damaged magnetoresistive sensor, comprising:

a processor programmed to determine a difference in measured resistances at positive and negative currents of a first sensor;

the processor being programmed to determine a difference in measured resistances at positive and negative currents of a second sensor;

the processor being programmed to output at least one of the differences, or a derivative of the at least one of the differences; and the processor being programmed to determine at least one of a fractional change in resistance and a scaled resistance for each sensor at each of the current levels, wherein the output is indicative of a diagnosis of the first sensor as being damaged if a magnitude of the difference in the measured resistances at positive and negative currents of the first sensor is less than a magnitude of the difference in the measured resistances at positive and negative currents of the second sensor, wherein the first and second sensors are independent sensors in an array of sensors formed on a common substrate.

10. The system as recited in claim 9, further comprising diagnosing the first sensor as having electrostatic discharge damage if the first sensor has a similar resistance value at a given bias current level as the second sensor has at the same bias current level.

11. The system as recited in claim 9, wherein the scaled resistance is determined at each of the bias current levels using the following equation:

$$\Delta R_{Scale} = [R_{mr}(I_{mr}) - R_{mr}(I_{mr}=0)]/R_{mr}(I_{mr}),$$

where $\Delta R_{scale}$ is defined as a scaled resistance at a particular $I_{mr}$;

$I_{mr}$ is the bias current level applied to the respective sensor;

$R_{mr}$ is defined as the measured resistance at the $I_{mr}$.

12. The system as recited in claim 9, wherein only sensors are present on the common substrate.

13. A system for detecting a damaged magnetoresistive sensor, comprising:

a processor programmed to determine a difference in measured resistances at positive and negative currents of a first sensor;

the processor being programmed to determine a difference in measured resistances at positive and negative currents of a second sensor;

the processor being programmed to output at least one of the differences, or a derivative of the at least one of the differences; and the processor being programmed to determine at least one of a fractional change in resistance and a scaled resistance for each sensor at each of the current levels, wherein the output is indicative of a diagnosis of the first sensor as being damaged if a sign of the difference in the measured resistances at positive and negative currents of the first sensor is inverse to a sign of the difference in the measured resistances at positive and negative currents of the second sensor, wherein the first and second sensors are independent sensors in an array of sensors formed on a common substrate.

14. The system as recited in claim 13, further comprising diagnosing the first sensor as having magnetic damage which is most likely caused by electrostatic discharge damage if the first sensor has a similar resistance value at a given bias current level as the second sensor has at the same bias current level.

15. The system as recited in claim 13, wherein the scaled resistance is determined at each of the bias current levels using the following equation:

$$\Delta R_{Scale} = [R_{mr}(I_{mr}) - R_{mr}(I_{mr}=0)]/R_{mr}(I_{mr}),$$

where $\Delta R_{Scale}$ is defined as a scaled resistance at a particular $I_{mr}$;

$I_{mr}$ is the bias current level applied to the respective sensor;
$R_{mr}$ is defined as the measured resistance at the $I_{mr}$.

16. The system as recited in claim 13, wherein only sensors are present on the common substrate.

17. A computer program product for detecting a damaged magnetoresistive sensor, the computer program product comprising:
- a non-transitory computer readable storage medium having computer readable program code embodied therewith, the computer readable program code comprising:
- computer readable program code configured to measure a resistance of a first sensor upon application thereto of a positive bias current at several different levels;
- computer readable program code configured to measure the resistance of the first sensor upon application thereto of a negative bias current at several different levels;
- computer readable program code configured to determine a difference in the measured resistances of the first sensor at the positive and negative current levels;
- computer readable program code configured to measure a resistance of a second sensor upon application thereto of a positive bias current at several different levels;
- computer readable program code configured to measure the resistance of the second sensor upon application thereto of a negative bias current at several different levels;
- computer readable program code configured to determine a difference in the measured resistances of the second sensor at the positive and negative current levels; and
- computer readable program code configured to output at least one of the differences, or a derivative of the at least one of the differences,
- wherein at least one of a fractional change in resistance and a scaled resistance is determined for each sensor at each of the current levels.

18. The computer program product as recited in claim 17, wherein the first and second sensors are present on a common substrate.

19. The computer program product as recited in claim 17, wherein the fractional change in resistance is determined for each sensor at each of the current levels using the following equation:

$$\Delta R_{mr} = [R_{mr}(I_{mr}) - R_{mr}(I_{mr}=0)]/R_{mr}(I_{mr}=0),$$

where $\Delta R_{mr}$ is defined as the fractional change in resistance at a particular $I_{mr}$;
$I_{mr}$ is the bias current level applied to the respective sensor;
$R_{mr}$ is defined as the measured resistance at the $I_{mr}$;
wherein the scaled resistance is determined for each sensor at each of the bias current levels using the following equation:

$$\Delta R_{Scale} = [R_{mr}(I_{mr}) - R_{mr}(I_{mr}=0)]/R_{mr}(I_{mr}),$$

where $\Delta R_{Scale}$ is defined as a scaled resistance at a particular $I_{mr}$;
$I_{mr}$ is the bias current level applied to the respective sensor;
$R_{mr}$ is defined as the measured resistance at the $I_{mr}$.

* * * * *